United States Patent
Hara et al.

(10) Patent No.: US 8,782,191 B2
(45) Date of Patent: Jul. 15, 2014

(54) COMPUTER SYSTEM HAVING REPRESENTATIVE MANAGEMENT COMPUTER AND MANAGEMENT METHOD FOR MULTIPLE TARGET OBJECTS

(75) Inventors: Junichi Hara, Sagamihara (JP); Yasutaka Kono, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 415 days.

(21) Appl. No.: 13/131,582

(22) PCT Filed: Feb. 24, 2011

(86) PCT No.: PCT/JP2011/054123
§ 371 (c)(1),
(2), (4) Date: May 26, 2011

(87) PCT Pub. No.: WO2012/114492
PCT Pub. Date: Aug. 30, 2012

(65) Prior Publication Data
US 2012/0221729 A1    Aug. 30, 2012

(51) Int. Cl.
*G06F 15/173* (2006.01)
*G06F 3/06* (2006.01)

(52) U.S. Cl.
CPC .............. *G06F 3/0605* (2013.01); *G06F 3/067* (2013.01); *Y10S 707/9994* (2013.01)
USPC ........... 709/223; 709/224; 709/225; 709/226; 718/104; 707/999.01

(58) Field of Classification Search
CPC ..... G06F 3/067; G06F 3/0605; G06F 3/0689; G06F 11/3409; G06F 3/0631; G06F 3/0653; G06F 3/0601; G06F 2201/885
USPC ......... 709/223–226; 718/104–15; 707/999.01
See application file for complete search history.

(56) References Cited

U.S. PATENT DOCUMENTS 6,684,209 B1 *  1/2004  Ito et al. ......................... 707/783
7,707,199 B2    4/2010  Shinohara et al.
(Continued)

FOREIGN PATENT DOCUMENTS

JP    2002-063063 A    2/2002
JP    2004-318741 A    11/2004
JP    2008-117251 A    5/2008

OTHER PUBLICATIONS

PCT International Search Report and Written Opinion on application No. PCT/JP2011/054123 dated Apr. 19, 2011; 6 pages.

(Continued)

*Primary Examiner* — Alina N Boutah
(74) *Attorney, Agent, or Firm* — Foley & Lardner LLP

(57) ABSTRACT

Even when a configuration in which instances of plural kinds of storage management software having equivalent functions are arranged to cooperatively manage a large-scale storage system is adopted, to prevent occurrence of a management inoperability and configuration information inconsistency and enable the same management operation and information reference as those performed when all management target objects are managed by a single instance. In the present invention, a representative management computer serving as a representative among management computers is determined. The representative management computer collects, from storage apparatuses and host computers, information concerning the management target objects and configuration summary information including a relation type among the objects and determines, on the basis of the configuration summary information, management target objects which each of the management computers should take charge of.

13 Claims, 24 Drawing Sheets

(56) References Cited

U.S. PATENT DOCUMENTS

| | | |
|---|---|---|
| 2001/0054093 A1 | 12/2001 | Iwatani |
| 2002/0152293 A1* | 10/2002 | Hahn et al. .................. 709/223 |
| 2003/0061331 A1* | 3/2003 | Nakamura et al. ........... 709/223 |
| 2003/0163568 A1* | 8/2003 | Kano et al. ................... 709/225 |
| 2003/0191829 A1* | 10/2003 | Masters et al. ............... 709/223 |
| 2003/0208589 A1* | 11/2003 | Yamamoto .................... 709/224 |
| 2004/0133576 A1* | 7/2004 | Ito et al. ........................... 707/9 |
| 2005/0033800 A1 | 2/2005 | Kavuri et al. |
| 2005/0210192 A1* | 9/2005 | Nagasuka et al. ............ 711/114 |
| 2006/0218199 A1* | 9/2006 | Kishi ............................ 707/200 |
| 2007/0214253 A1 | 9/2007 | Akagawa et al. |
| 2008/0034077 A1* | 2/2008 | Takashige et al. ........... 709/223 |
| 2008/0065850 A1* | 3/2008 | Nakamura et al. ........... 711/163 |
| 2008/0109442 A1* | 5/2008 | Shinohara et al. ............. 707/10 |
| 2008/0235365 A1* | 9/2008 | Bansal et al. ................. 709/224 |
| 2008/0320219 A1* | 12/2008 | Okada et al. .................. 711/114 |
| 2009/0031320 A1* | 1/2009 | Nakagawa et al. ........... 718/104 |
| 2009/0235269 A1* | 9/2009 | Nakajima et al. ............. 718/104 |
| 2010/0199041 A1* | 8/2010 | Schnapp et al. .............. 711/114 |
| 2011/0047321 A1* | 2/2011 | Taguchi et al. ............... 711/103 |
| 2011/0060883 A1* | 3/2011 | Otani ............................ 711/162 |
| 2011/0258402 A1* | 10/2011 | Nakajima et al. ............. 711/154 |
| 2012/0017061 A1* | 1/2012 | Kawaguchi .................... 711/165 |
| 2012/0215895 A1* | 8/2012 | Kono et al. ................... 709/223 |

OTHER PUBLICATIONS

UK Intellectual Property Office Examination Report on application GB 1303104.2 mailed Apr. 9, 2013; 2 pages.

* cited by examiner

| Host device ID | Storage apparatus ID | Storage volume ID | Capacity | Used capacity | ... |
|---|---|---|---|---|---|
| DEV_A1 | STR_A | VOL_A1 | 10GB | 5GB | |
| DEV_A2 | STR_A | VOL_A2 | 20GB | 10GB | |
| DEV_A3 | STR_A | VOL_A3 | 50GB | 10GB | |
| DEV_A4 | STR_A | VOL_A4 | 80GB | 20GB | |

(b)

| Storage volume ID | External storage apparatus ID | External storage volume ID | Capacity | RAID group | ... |
|---|---|---|---|---|---|
| VOL_A1 | - | - | 10GB | RG_A1 | |
| VOL_A2 | - | - | 20GB | RG_A2 | |
| VOL_A3 | STR_B | VOL_B3 | 50GB | - | |
| VOL_A4 | STR_B | VOL_B4 | 80GB | - | |

(c)

| Storage volume ID | Capacity | RAID group | ... |
|---|---|---|---|
| VOL_B3 | 50GB | RG_B1 | |
| VOL_B4 | 80GB | RG_B2 | |

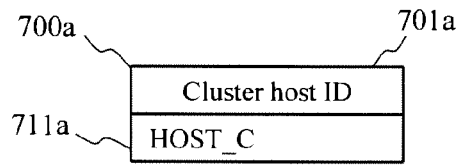

(b)

| Host device ID | Storage apparatus ID | Storage volume ID | Capacity | Allocation destination virtual server ID | ... |
|---|---|---|---|---|---|
| DEV_D1 | STR_C | VOL_C1 | 10GB | VSERV_D | |
| DEV_D2 | STR_C | VOL_C2 | 20GB | VSERV_D | |

(c)

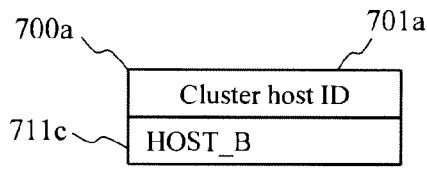

(d)

| Host device ID | Storage apparatus ID | Storage volume ID | Capacity | Allocation destination virtual server ID | ... |
|---|---|---|---|---|---|
| DEV_D1 | STR_C | VOL_C1 | 10GB | - | |
| DEV_D2 | STR_C | VOL_C2 | 20GB | - | |

(e)

| Storage volume ID | Capacity | RAID group | ... |
|---|---|---|---|
| VOL_C1 | 10GB | RG_C1 | |
| VOL_C2 | 20GB | RG_C2 | |

| Host device ID | Storage apparatus ID | Storage volume ID | Capacity | Used Capacity | ... |
|---|---|---|---|---|---|
| DEV_E1 | STR_E | VOL_E1 | 30GB | 25GB | |
| DEV_E2 | STR_E | VOL_E2 | 70GB | 10GB | |
| DEV_E3 | STR_E | VOL_E3 | 40GB | 20GB | |

(b)

| Host device ID | Storage apparatus ID | Storage volume ID | Capacity | Used Capacity | ... |
|---|---|---|---|---|---|
| DEV_F1 | STR_F | VOL_F1 | 30GB | 25GB | |
| DEV_F2 | STR_F | VOL_F2 | 70GB | 10GB | |

(c)

| Storage volume ID | Primary volume ID | Secondary volume ID | Copy type | Remote storage apparatus ID | Capacity | RAID group | ... |
|---|---|---|---|---|---|---|---|
| VOL_E1 | - | VOL_F1 | RC | STR_F | 30GB | RG_E1 | |
| VOL_E2 | - | VOL_F2 | RC | STR_F | 70GB | RG_E2 | |
| VOL_E3 | - | VOL_E4 | LC | - | 40GB | RG_E3 | |
| VOL_E4 | VOL_E3 | - | LC | - | 40GB | RG_E4 | |

(d)

| Storage volume ID | Primary volume ID | Secondary volume ID | Copy type | Remote storage apparatus ID | Capacity | RAID group | ... |
|---|---|---|---|---|---|---|---|
| VOL_F1 | VOL_E1 | - | RC | STR_E | 30GB | RG_F1 | |
| VOL_F2 | VOL_E2 | - | RC | STR_E | 70GB | RG_F2 | |

| Member instance ID | IP address | Site ID |
|---|---|---|
| MGNT_A | 192.168.0.2 | - |
| MGNT_B | 192.168.0.3 | - |
| MGNT_C | 192.168.0.4 | - |

(b)

| Member instance ID | IP address | Site ID |
|---|---|---|
| MGNT_E | 192.168.10.1 | SITE_E |
| MGNT_F | 192.168.20.1 | SITE_F |

Fig. 11

| Management target IP address | Management target type |
|---|---|
| 192.168.0.2 | HOST |
| 192.168.0.3 | STORAGE |
| 192.168.0.4 | HOST |

| Priority | Relation type |
|---|---|
| 1 | LC |
| 2 | CLUSTER |
| 3 | MAP |

| Host device ID | Related storage apparatus ID | Related storage volume ID | Relation type |
|---|---|---|---|
| DEV_A1 | STR_A | VOL_A1 | MAP |
| DEV_A2 | STR_A | VOL_A2 | MAP |
| DEV_A3 | STR_A | VOL_A3 | MAP |
| DEV_A4 | STR_A | VOL_A4 | MAP |

(b)

| Storage volume ID | Related storage apparatus ID | Related storage volume ID | Relation type |
|---|---|---|---|
| VOL_A1 | - | - | - |
| VOL_A2 | - | - | - |
| VOL_A3 | STR_B | VOL_B3 | EXT |
| VOL_A4 | STR_B | VOL_B4 | EXT |

(c)

| Storage volume ID | Related storage apparatus ID | Related storage volume ID | Relation type |
|---|---|---|---|
| VOL_B3 | - | - | - |
| VOL_B4 | - | - | - |

| Related host ID | Relation type |
|---|---|
| HOST_C | CLUSTER |

1500a, 1501a, 1502a, 1511a (b)

| Host device ID | Related storage apparatus ID | Related storage volume ID | Relation type |
|---|---|---|---|
| DEV_C1 | STR_C | VOL_C1 | MAP |
| DEV_C2 | STR_C | VOL_C2 | MAP |

1400a, 1401a, 1402a, 1403a, 1404a, 1511b, 1512b (c)

| Related host ID | Relation type |
|---|---|
| HOST_B | CLUSTER |

1500a, 1501a, 1502a, 1511c (d)

| Host device ID | Related storage apparatus ID | Related storage volume ID | Relation type |
|---|---|---|---|
| DEV_C1 | STR_C | VOL_C1 | MAP |
| DEV_C2 | STR_C | VOL_C2 | MAP |

1400a, 1401a, 1402a, 1403a, 1404a, 1511d, 1512d (e)

| Storage volume ID | Related storage apparatus ID | Related storage volume ID | Relation type |
|---|---|---|---|
| VOL_C1 | - | - | - |
| VOL_C2 | - | - | - |

| Host device ID | Related storage apparatus ID | Related storage volume ID | Relation type |
|---|---|---|---|
| DEV_E1 | STR_E | VOL_E1 | MAP |
| DEV_E2 | STR_E | VOL_E2 | MAP |

(b)

| Host device ID | Related storage apparatus ID | Related storage volume ID | Relation type |
|---|---|---|---|
| DEV_F1 | STR_F | VOL_F1 | MAP |
| DEV_F2 | STR_F | VOL_F2 | MAP |

(c)

| Storage volume ID | Related storage apparatus ID | Related storage volume ID | Relation type |
|---|---|---|---|
| VOL_E1 | STR_F | VOL_F1 | RC |
| VOL_E2 | STR_F | VOL_F2 | RC |
| VOL_E3 | - | VOL_E4 | LC |
| VOL_E4 | - | VOL_E3 | LC |

(d)

| Storage volume ID | Related storage apparatus ID | Related storage volume ID | Relation type |
|---|---|---|---|
| VOL_F1 | STR_E | VOL_E1 | RC |
| VOL_F2 | STR_E | VOL_E2 | RC |

Fig. 17

| Site ID 1701 | Host ID 1702 | Host device ID 1703 | Primary 1711 | | | | Secondary 1712 | | | | | Number of objects 1708 |
|---|---|---|---|---|---|---|---|---|---|---|---|---|
| | | | Storage apparatus ID 1704 | Storage volume ID 1705 | External storage apparatus ID 1706 | External storage volume ID 1707 | Host ID 1702 | Host device ID 1703 | Storage apparatus ID 1704 | Storage volume ID 1705 | External storage apparatus ID 1706 | External storage volume ID 1707 | |
| 1721 - | HOST_A | DEV_A1 | STR_A | VOL_A1 | - | - | - | - | - | - | - | - | 2 |
| 1722 - | HOST_A | DEV_A2 | STR_A | VOL_A2 | - | - | - | - | - | - | - | - | 2 |
| 1723 - | HOST_A | DEV_A3 | STR_A | VOL_A3 | STR_B | VOL_B3 | - | - | - | - | - | - | 3 |
| 1724 - | HOST_A | DEV_A4 | STR_A | VOL_A4 | STR_B | VOL_B4 | - | - | - | - | - | - | 3 |

| 1701 | 1702 | 1703 | 1704 | 1705 | 1706 | 1707 | 1702 | 1703 | 1704 | 1705 | 1706 | 1707 | 1708 |
| --- | --- | --- | --- | --- | --- | --- | --- | --- | --- | --- | --- | --- | --- |
| | | | Primary 1711 | | | | | | Secondary 1712 | | | | |
| Site ID | Host ID | Host device ID | Storage apparatus ID | Storage volume ID | External storage apparatus ID | External storage volume ID | Host ID | Host device ID | Storage apparatus ID | Storage volume ID | External storage apparatus ID | External storage volume ID | Number of objects |
| - | HOST_B | DEV_D1 | STR_C | VOL_C1 | - | - | HOST_C | DEV_D1 | - | - | - | - | 3 |
| - | HOST_B | DEV_D2 | STR_C | VOL_C1 | - | - | HOST_C | DEV_D2 | - | - | - | - | 3 |

| Site ID | Host ID | Host device ID | Primary | | | | Secondary | | | | | Number of objects |
|---|---|---|---|---|---|---|---|---|---|---|---|---|
| | | | Storage apparatus ID | Storage volume ID | External storage apparatus ID | External storage volume ID | Host ID | Host device ID | Storage apparatus ID | Storage volume ID | External storage apparatus ID | External storage volume ID | |
| SITE_E | HOST_E | DEV_E1 | STR_E | VOL_E1 | - | - | - | - | - | - | - | - | 2 |
| SITE_E | HOST_E | DEV_E2 | STR_E | VOL_E2 | - | - | - | - | - | - | - | - | 2 |
| SITE_E | HOST_E | DEV_E3 | STR_E | VOL_E3 | - | - | - | - | STR_E | VOL_E4 | - | - | 3 |
| SITE_F | HOST_F | DEV_F1 | STR_F | VOL_F1 | - | - | - | - | - | - | - | - | 2 |
| SITE_F | HOST_F | DEV_F2 | STR_F | VOL_F2 | - | - | - | - | - | - | - | - | 2 |

Fig. 20

| | Site ID | Host ID | Host device ID | Primary | | | | Secondary | | | | | | Number of objects |
|---|---|---|---|---|---|---|---|---|---|---|---|---|---|---|
| | | | | Storage apparatus ID | Storage volume ID | External storage apparatus ID | External storage volume ID | Host ID | Host device ID | Storage apparatus ID | Storage volume ID | External storage apparatus ID | External storage volume ID | |
| 2021 | SITE_E | - | - | STR_E | VOL_E1 | - | - | - | - | - | - | - | - | 1 |
| 2022 | SITE_E | - | - | STR_E | VOL_E2 | - | - | - | - | - | - | - | - | 1 |
| 2023 | SITE_E | - | - | STR_E | VOL_E3 | - | - | - | - | STR_E | VOL_E4 | - | - | 2 |
| 2024 | SITE_F | - | - | STR_F | VOL_F1 | - | - | - | - | - | - | - | - | 1 |
| 2025 | SITE_F | - | - | STR_F | VOL_F2 | - | - | - | - | - | - | - | - | 1 |
| 2026 | SITE_E | HOST_E | DEV_E1 | - | - | - | - | - | - | - | - | - | - | 1 |
| 2027 | SITE_E | HOST_E | DEV_E2 | - | - | - | - | - | - | - | - | - | - | 1 |
| 2028 | SITE_F | HOST_F | DEV_F1 | - | - | - | - | - | - | - | - | - | - | 1 |
| 2029 | SITE_F | HOST_F | DEV_F2 | - | - | - | - | - | - | - | - | - | - | 1 |

Fig. 23

| | | | Primary | | | | | Secondary | | | | | |
|---|---|---|---|---|---|---|---|---|---|---|---|---|---|
| Site ID (1701) | Host ID (1702) | Host device ID (1703) | Storage apparatus ID (1704) | Storage volume ID (1705) | External storage apparatus ID (1706) | External storage volume ID (1707) | Host ID (1702) | Host device ID (1703) | Storage apparatus ID (1704) | Storage volume ID (1705) | External storage apparatus ID (1706) | External storage volume ID (1707) | Number of objects (1708) | In-charge member instance (2301) |
| - | HOST_A | DEV_A1 | STR_A | VOL_A1 | - | - | - | - | - | - | - | - | 2 | MGNT_A |
| - | HOST_A | DEV_A2 | STR_A | VOL_A2 | - | - | - | - | - | - | - | - | 2 | MGNT_A |
| - | HOST_A | DEV_A3 | STR_A | VOL_A3 | STR_B | VOL_B3 | - | - | - | - | - | - | 3 | MGNT_B |
| - | HOST_A | DEV_A4 | STR_A | VOL_A4 | STR_B | VOL_B4 | - | - | - | - | - | - | 3 | MGNT_C |

Fig. 24

| Site ID | Host ID | Host device ID | Primary | | | | Secondary | | | | | Number of objects | In-charge member instance |
|---|---|---|---|---|---|---|---|---|---|---|---|---|---|
| | | | Storage apparatus ID | Storage volume ID | External storage apparatus ID | External storage volume ID | Host ID | Host device ID | Storage apparatus ID | Storage volume ID | External storage apparatus ID | External storage volume ID | | |
| SITE_E | HOST_E | DEV_E1 | STR_E | VOL_E1 | - | - | - | - | - | - | - | - | 2 | MGNT_E |
| SITE_E | HOST_E | DEV_E2 | STR_E | VOL_E2 | - | - | - | - | - | - | - | - | 2 | MGNT_E |
| SITE_E | HOST_E | DEV_E3 | STR_E | VOL_E3 | - | - | - | - | STR_E | VOL_F4 | - | - | 3 | MGNT_E |
| SITE_F | HOST_F | DEV_F1 | STR_F | VOL_F1 | - | - | - | - | - | - | - | - | 2 | MGNT_F |
| SITE_F | HOST_F | DEV_F2 | STR_F | VOL_F2 | - | - | - | - | - | - | - | - | 2 | MGNT_F |

COMPUTER SYSTEM HAVING REPRESENTATIVE MANAGEMENT COMPUTER AND MANAGEMENT METHOD FOR MULTIPLE TARGET OBJECTS

TECHNICAL FIELD

The present invention relates to a computer system and a management method for the computer system and a program and relates to, for example, management of a large-scale storage system in which plural host computers and plural storage apparatuses are present.

BACKGROUND ART

A data amount managed by a company keeps on increasing according to the development of the information society in recent years. On the other hand, for a reduction in management cost of an IT system and the like, an increasing number of general companies adopt a form of not owning an IT system and leasing the IT system from a specialty company which manages and provides the IT system. According to the increase, data managed by the companies are being aggregated in the IT system owned by the specialty company which manages and provides the IT system. In order to make it possible to accumulate the enormous data aggregated in this way, an increase in the size of a storage system included in the IT system steadily advances.

According to the increase in the size of the storage system, the number of objects treated by storage management software for managing the storage system (e.g., the number of volumes provided by a storage apparatus) also increases. As a result of such an increase in the number of objects, a problem occurs in that a maximum number of objects assumed by the storage management software at a design stage is exceeded, a long time is required for acquisition of configuration information necessary for management (e.g., information concerning volumes seen on a host computer and correspondence information between volumes provided by a storage computer and physical storage areas), or it takes time to process information search or the like on the storage management software according to the increase in the number of objects and operation response falls.

In order to solve such a problem, for example, Patent Literature 1 proposes to adopt a configuration in which plural instances of the storage management software having equivalent functions (hereinafter also referred to as "management software instances" or "member instances" or simply referred to as "instances") are arranged, volumes in the host computer and the storage apparatus, which are management targets, are distributed to each of the instances, and the volumes are managed among the instances in cooperation with one another.

CITATION LIST

Patent Literature

Patent Literature 1: JP Patent Publication (Kokai) No. 2008-117251 A (U.S. Pat. No. 7,707,199)

SUMMARY OF INVENTION

Technical Problem

However, even if the method proposed by Patent Literature 1 is adopted, in some case, objects related to each other are present in configuration information of the host computer or the storage apparatus and only one of these objects is set as a management target. In such a case, it is likely that management operation is impossible or inconsistency occurs in the configuration information. For example, in a local copy function provided by the storage apparatus (a function of copying data of a volume to another volume in the same storage apparatus), when the volumes of a copy source and a copy destination of the data are respectively set as management targets of different management software instances, it is likely that management operation such as suspend and resynchronization of the copying is impossible. When host computers included in a cluster are respectively set as management targets of different management software instances and collection timings for configuration information are separately controlled, inconsistency in terms of the configuration information occurs in that information concerning resources (e.g., a virtual server) moved among host computers included in the cluster disappears from both the management software instances or both the management software instances redundantly store the information.

The present invention has been devised in view of such a situation and, even when a configuration in which instances of plural kinds of storage management software having equivalent functions are arranged to cooperatively manage a large-scale storage system is adopted to reduce loads on the instances, prevents occurrence of a management inoperable state and inconsistency in terms of configuration information and enables the same management operation and information reference as those performed when all management target objects are managed by a single instance.

Solution to Problem

In order to solve the problems, in the present invention, in a configuration in which instances of plural kinds of storage management software having equivalent functions are arranged, a representative instance among the instances is determined, the representative instance acquires configuration summary information including management target objects and a relation among the objects from all host computers and all storage apparatuses set as management targets, determines management targets of the instances on the basis of this configuration summary information, and notifies the instances of the management targets.

A computer system according to the present invention includes: one or plural host computers; one or plural storage subsystems which are coupled to the one or plural host computers and provide the host computers with information; and plural management computers which are coupled to the one or plural storage subsystems and the one or plural host computers and manage plural management target objects included in the storage subsystems and the host computers. One of the plural management computers serves as a representative management computer among the plural management computers and collects, from the one or plural host computers and the one or plural storage subsystems, object information including information for specifying the plural management target objects and configuration summary information including relation type information indicating a relation among the plural management target objects. The representative management computer determines, on the basis of the configuration summary information, management target objects which each of the plural management computers should aggregate and take charge of and notifies the plural management computers of the management target objects.

Further characteristics related to the present invention will be made apparent from the description of this specification and the accompanying drawings. A form of the present invention is attained and realized by elements and a combination of various elements, the following detailed description, and a form of appended claims.

It is necessary to understand that the description of this specification is merely a typical illustration and by no means limits the scope of claims and application examples of the present invention.

Advantageous Effects of Invention

According to the present invention, even when a configuration in which instances of plural kinds of storage management software having equivalent functions are arranged to cooperatively manage a large-scale storage system is adopted to reduce loads on the instances, it is possible to prevent occurrence of a management inoperable state and inconsistency in terms of configuration information and enable the same management operation and information reference as those performed when all management target objects are managed by a single instance.

BRIEF DESCRIPTION OF DRAWINGS

FIG. 5 is a diagram of examples of configuration information respectively stored as parts of management information tables by a management agent on the host computer, a micro program on the storage apparatus, and a micro program on the external storage apparatus when there is the correspondence shown in FIG. 4.

FIG. 7 is a diagram showing examples of configuration information respectively stored as parts of management information tables by the management agent on the host computer and the micro program on the storage apparatus when there is the correspondence shown in FIG. 6.

FIG. 9 is a diagram showing examples of configuration information respectively stored as parts of management information tables by the management agent on the host computer and the micro program on the storage apparatus when there is the correspondence shown in FIG. 8.

FIG. 10 is examples of member instance tables stored as a part of a management information table by management software on the management server in the present invention.

FIG. 11 is a diagram showing an example of a management target table in the present invention.

FIG. 14 is a diagram of configuration examples of configuration summary information acquired from the host computer, the storage apparatus, and the external storage apparatus by the management software on the management server of the present invention when there is the correspondence shown in FIG. 4.

FIG. 15 is a diagram showing configuration examples of configuration summary information acquired from the host computer and the storage apparatus by the management software on the management server of the present invention when there is the correspondence shown in FIG. 6.

FIG. 16 is a diagram showing configuration examples of configuration summary information acquired from the host computer and the storage apparatus by the management software on the management server of the present invention when there is the correspondence shown in FIG. 8.

FIG. 17 is a diagram showing a configuration example of a configuration information summary table stored as a part of the management information table by the management software on the management server in the present invention when there is the correspondence shown in FIG. 4.

FIG. 18 is a diagram showing a configuration example of a configuration information summary table stored as a part of the management information table by the management software on the management server in the present invention when there is the correspondence shown in FIG. 6.

FIG. 19 is a diagram showing a configuration example (1) of a configuration information summary table stored as a part of the management information table by the management software on the management server in the present invention when there is the correspondence shown in FIG. 8.

FIG. 20 is a diagram showing a configuration example (2) of the configuration information summary table stored as a part of the management information table by the management software on the management server in the present invention when there is the correspondence shown in FIG. 8.

FIG. 23 is a diagram showing a configuration example (1) of an in-charge instance table stored as a part of the management information table by the management software on the management server in the present invention.

FIG. 24 is a diagram showing a configuration example (2) of the in-charge instance table stored as a part of the management information table by the management software on the management server in the present invention.

DESCRIPTION OF EMBODIMENTS

Embodiments of the present invention are explained below with reference to the accompanying drawings. In the accompanying drawings, in some case, functionally the same components are denoted by the same numbers. The accompanying drawings show specific embodiments and implementation examples conforming to the principle of the present invention. However, these drawings are for the understanding of the present invention and are not used to limitedly interpret the present invention.

The embodiments are explained in detail sufficiently for those skilled in the art to carry out the present invention. However, it is necessary to understand that other implementations and forms are also possible and changes of configurations and structures and replacement of various elements are possible without departing from the scope and the spirit of the technical idea of the present invention. Therefore, the following description should not be interpreted to be limited to the description.

Further, as explained later, the embodiments of the present invention may be implemented as software running on a general-purpose computer or may be implemented as dedicated hardware or a combination of software and hardware.

In the following explanation, kinds of information of the present invention are explained according to a "table" format. However, these kinds of information do not always have to be represented in a data structure by a table and may be represented in a data structure of a list, a DB, a queue, or the like or other structures. Therefore, in order to indicate that the information does not depend on the data structure, in some case, "table", "list", "DB", "queue", and the like are simply referred to as "information".

When contents of the kinds of information are explained, expressions such as "identification information", "identifier", "name", and "ID" can be used. These expressions can be interchanged.

Kinds of processing in the embodiments of the present invention are explained below using "program" as a subject (an operation entity). However, since the program is executed by a processor to perform set processing using a memory and a communication port (a communication control device), the processing may be explained using the processor as a subject. The processing disclosed using the program as the subject may be performed by a computer or an information processing apparatus such as a management server. A part or all of the program may be realized by dedicated hardware or may be formed as a module. Various programs may be installed in computers by a program distribution server or storage media.

(1) First Embodiment

Configuration of a Storage System

Figure 1:
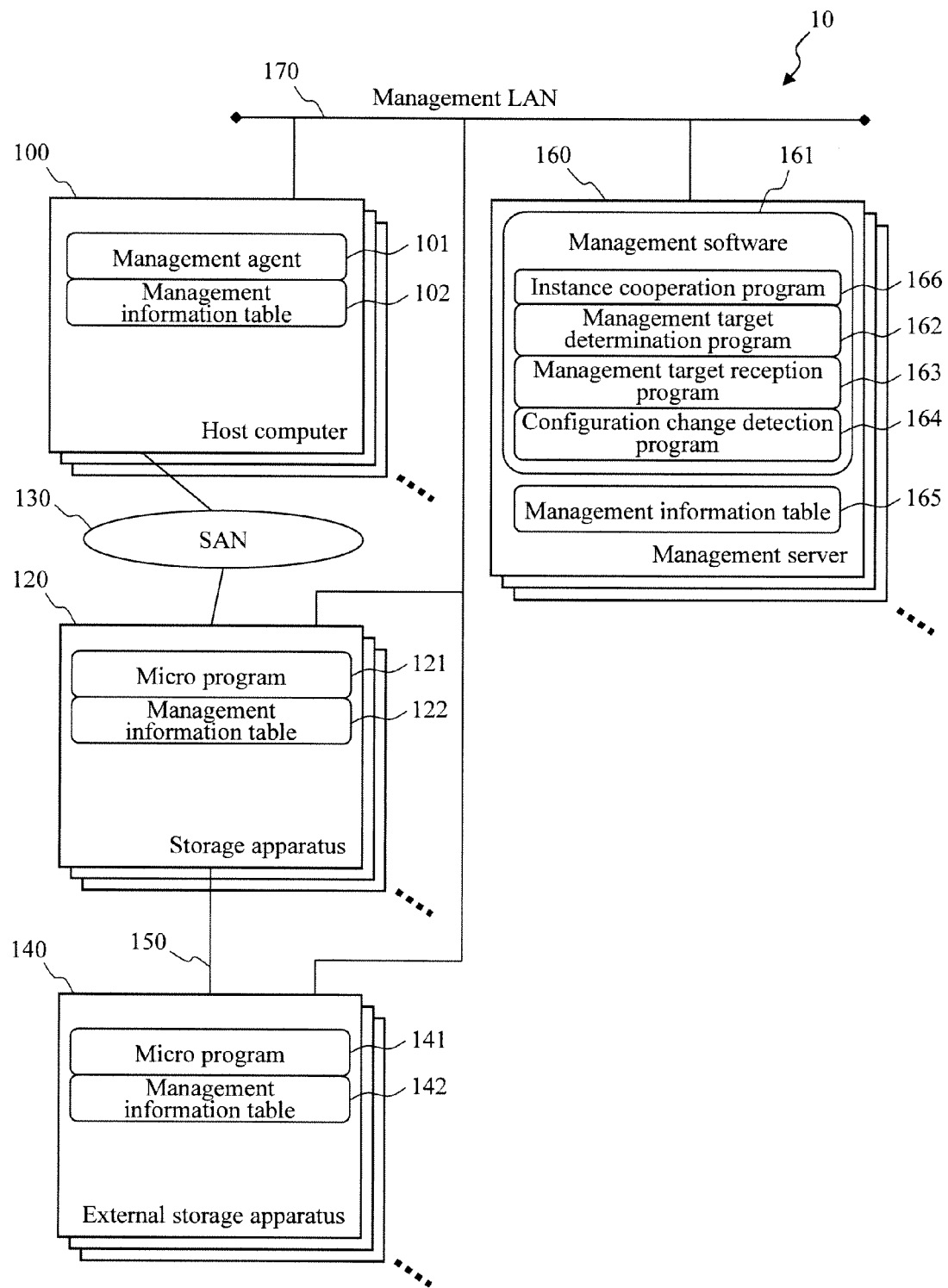
FIG. 1 is a diagram showing a schematic configuration example of a computer system (a storage system) according to a first embodiment of the present invention.

FIG. 1 is a diagram showing a schematic configuration example of a storage system (also referred to as computer system or IT system) 10 according to a first embodiment of the present invention. This system includes one or plural host computers 100, one or plural storage apparatuses (also referred to as storage subsystems) 120, and one or plural management servers 160, which are coupled to one another by a management LAN 170.

The host computers 100 and the storage apparatuses 120 are coupled to each other by a SAN 130. External storage apparatuses 140 are coupled to the storage apparatuses 120 by a SAN 150. The external storage apparatuses 140 are described for the explanation of this embodiment. However, the external storage apparatuses 140 do not always have to be provided. In this case, the SAN 150 is unnecessary. When the external storage apparatuses 140 are present, the SAN 150 which couples the external storage apparatuses 140 to the storage apparatuses 120 does not always have to be an independent network and may be a part of the SAN 130. In FIG. 1, the management servers 160 are not coupled to the SAN 130. However, the management servers 160 may be coupled to the SAN 130.

All the host computers 100, the storage apparatuses 120, and the external storage apparatuses 140 do not always need to be geographically set in the same locations. A part of the host computers 100, the storage apparatuses 120, and the external storage apparatuses 140 may be set in different locations away from the others. In some case, such a form is adopted for the purpose of DR (Disaster Recovery).

Internal Configuration of the Host Computer

Figure 2:
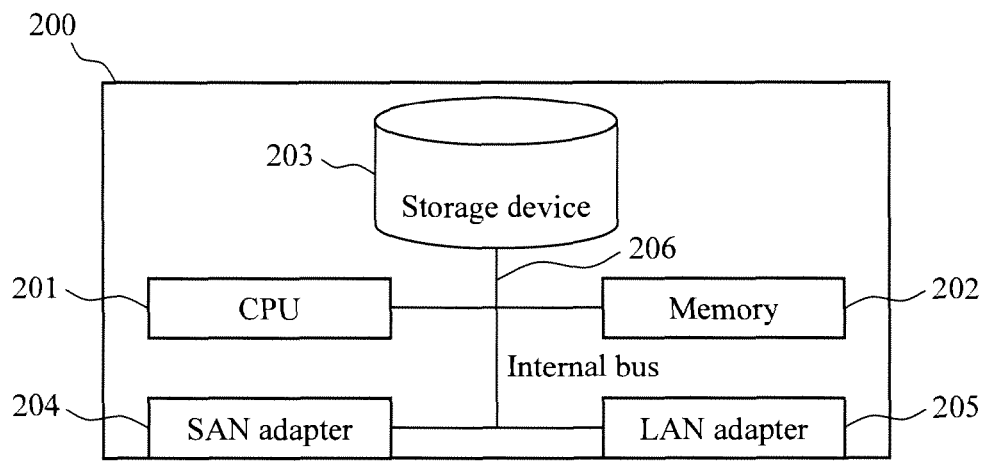
FIG. 2 is a diagram showing an internal configuration example of a host computer and a management server (a management computer).

FIG. 2 is a diagram showing an internal configuration example of the host computer 100. The host computer 100 includes one or more CPUs 201, one or more memories 202, one or more SAN adapters 204, one or more LAN adapters 205, and a storage device 203, which are coupled to one another by an internal bus 206.

The host computer 100 is coupled to the management server 160 via the LAN adapter 205 and coupled to the storage apparatus 120 via the SAN adapter 204. The storage device 203 is used to store a program running on the host computer and management information. However, the storage device 203 does not always have to be provided. When the storage device is not provided, the host computer 100 adopts, for example, a form of storing the program and the management information in volumes provided by the storage apparatus 120.

Internal Configuration of the Management Server

The management server 160 is coupled to the host computer 100, the storage apparatus 120, and the external storage apparatus 140 via the LAN adapter 205.

Each of the management servers (also referred to as management computers) 160 has the same configuration as that of the host computer 100.

As shown in FIG. 1, management software 161 runs on the management server 160. For example, the management software is loaded from a storage device to a memory and executed using a CPU (which can also be simply referred to as processor). The management software 161 based on the present invention runs on the plural management servers 160 and provides the same function. As explained above, the management software 161 on the management servers 160 is referred to as "management software instance" or "member instance" or simply referred to as "instance".

When the management server 160 is not coupled to the SAN 130 as shown in FIG. 1, the management server 160 does not always have to include the SAN adapter 204. The management software 161 and the management information table 165 may be stored in a memory or a storage device.

The management software 161 includes a management target determination program 162, a management target reception program 163, a configuration change detection program 164, and an instance cooperation program 166.

The management target determination program 162 has a function of executing, when an instance of the management target determination program 162 is set as a representative instance explained later, processing for distributing management target objects. The management target reception program 163 has a function of acquiring management information (also referred to as configuration information: information necessary in managing objects shown in FIG. 5) from the distributed management target objects. The configuration change detection program 164 has a function of detecting a configuration change in the management target objects. The instance cooperation program 166 has a function of associating the instances and synchronizing information such that management target information (FIG. 11) and aggregation priority information (FIG. 12) are the same in instances.

The management server 160 includes an input device and a display device (an output device), although not shown in the figure. It is also possible that a serial interface or an Ethernet interface is used as an input and output device as a substitute for this input and output device, a computer for display having a display, a keyboard, or a pointer device is coupled to the interface, information for display is transmitted to the computer for display, and information for input is received from the computer for display to perform display and receive an input in the computer for display to substitute input and display in the input and output device.

In the following explanation, in some case, a set of one or more computers which manage the storage system 10 and display information for display of the present invention is referred to as management system. When the management server (the management computer) 160 displays the information for display, the management server 160 is a management system and a combination of the management server 160 and the computer for display is also a management system. For an increase in speed and improvement of reliability of management processing, plural computers may realize processing equivalent to that of the management server. In this case, the plural computers (including the computer for display when the computer for display performs the processing) are management systems.

Internal Configuration of the Storage Apparatus

Figure 3:
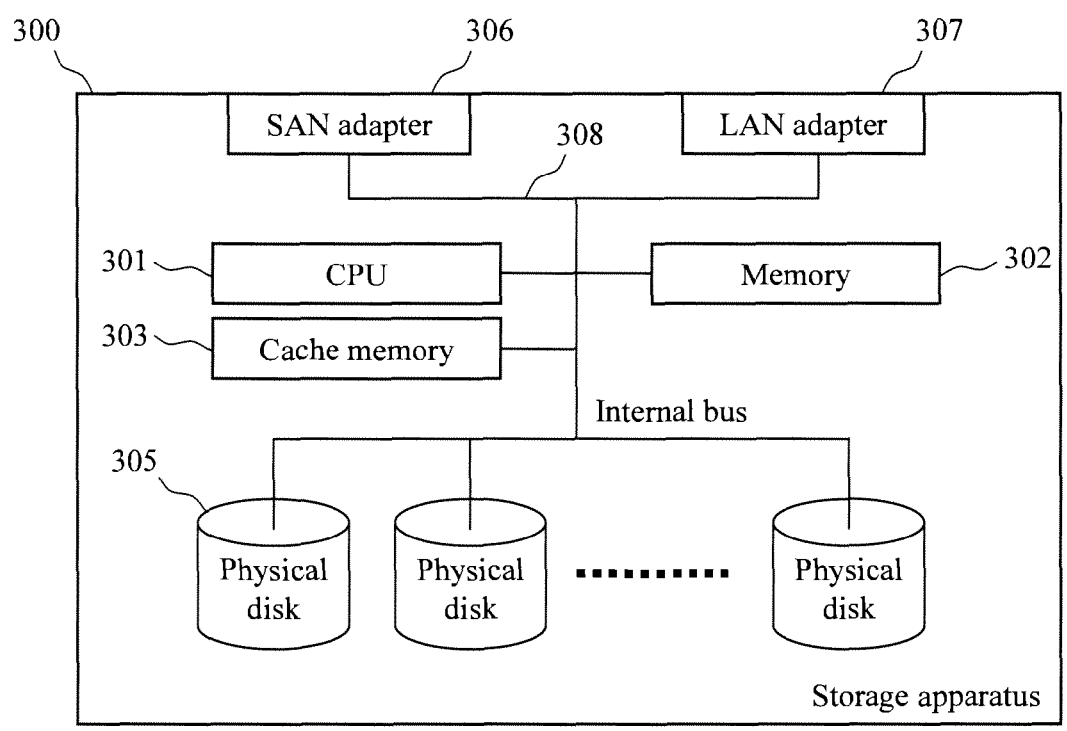
FIG. 3 is a diagram showing an internal configuration example of a storage apparatus and an external storage apparatus.

FIG. 3 is a diagram showing an internal configuration example of the storage apparatus (also referred to as storage subsystem) 120. The storage apparatus 120 includes one or more CPUs 301, one or more memories 302, one or more cache memories 303, one or more SAN adapters 306, one or more LAN adapters 307, and one or more physical disks 305, which are coupled to one another by an internal bus 308. The external storage apparatus 140 has the same configuration as that of the storage apparatus 120.

The storage apparatus 120 is coupled to the host computer 100 and the external storage apparatus 140 via the SAN adapter 306. The storage apparatus 120 is coupled to the management server 160 via the LAN adapter 307. The storage apparatus 120 adopts a form of storing a micro program and management information using the one or plural physical disks 305 or including a NVRAM (a nonvolatile memory) as a part of the memory 302 and storing the micro program and management information in the NVRAM.

The SAN 130 and the SAN 150 are storage area networks and usually configured using SAN switches. In the SAN 130 and the SAN 150, in most cases, a fibre channel protocol or an SCSI command is used. However, a storage area network based on the IP (Internet Protocol) may be used. When the storage apparatuses 120 are located in places distant from one another, in most cases, an extender as an apparatus for extending a reaching distance of the SAN 130 is partially used.

Operation Overview of the Storage System

As shown in FIG. 1, a management agent 101 runs on the host computer 100. The management agent 101 is loaded from the storage device 203 to the memory 202 and executed using the CPU 201. The management agent 101 collects configuration information of the host computer 100, stores the configuration information in the management information table 102, and transmits the configuration information to the management software 161 according to a request from the management software 161 on the management server 160. In some case, the management agent 101 adopts a form of periodically notifying the management software 161 of the configuration information.

In some case, an OS (Operating System) or virtualization software (Hypervisor) installed to cause the host computer 100 to operate includes a function equivalent to the management agent 101. The virtualization software is software which provides a virtual environment (a virtual server) having the same configuration as that of the host computer 100 such that plural OSs can run on a single host computer 100. The virtualization software gives virtual server IDs to provided virtual servers and manages the virtual servers. When the OS or the virtualization software includes the function equivalent to the management agent 101, it is unnecessary to separately arrange the management agent 101 on the host computer 100.

In some case, the OS or the virtualization software installed on the host computer 100 includes a cluster function. The cluster function is a function of transferring, when a failure occurs in a certain host computer 100, an operation state of a program running on this host computer 100 to another normal host computer 100 and enabling the program to continue the operation. When the OS or the virtualization software does not have this function, in some case, software running on the OS or the virtualization software adopts a form of realizing this function.

Further, the OS or the virtualization software manages identifiers (host IDs) given to the host computers 100. As the host IDs, for example, host names are used. The OS or the virtualization software gives identifiers (host device IDs) to volumes on the storage apparatus 120 accessible from the host computer 100 and manages the volumes.

As shown in FIG. 1, the storage apparatus 120 includes a micro program 121. This micro program 121 is a general term of a set of all programs running on the storage apparatus 120. The micro program 121 is loaded, for example, from the physical disk 305 to the memory 302 and executed using the CPU 301. The micro program 121 controls the storage apparatus 120 and performs management of data storage areas (volumes), allocation to the host computer 100, response to a data access request from the host computer 100, and the like. The micro program 121 configures volumes for one or plural physical disks 305 on the basis of RAID (Redundant Array Of Inexpensive Disks).

The storage apparatus 120 gives identifiers (storage volume IDs) to provided volumes and manages the volumes.

Identifiers (storage apparatus IDs) are given to the storage apparatuses. As the storage apparatus IDs, for example, serial numbers are used.

In some case, the storage apparatus 120 has an external storage coupling function. The storage apparatus 120 shown in FIG. 1 has this function. When the external storage apparatus 140 is coupled to the storage apparatus 120 having this function as shown in FIG. 1, the micro program 121 can show the volumes on the external storage apparatus 140 to the host computer 100 as if the volumes are volumes present on the storage apparatus 120.

Further, in some case, the storage apparatus 120 has a copy function. As this function, two kinds of copy function, which are a local copy function and a remote copy function, are mainly present. The storage apparatus 120 having the local copy function makes it possible to copy data in the volumes to other volumes in the same storage apparatus 120. The storage apparatus 120 having the remote copy function makes it possible to copy data in the volumes to the volumes on another storage apparatus 120 having the same function via the SAN 130.

The micro program 121 stores, in a part of the management information table 122, configuration information such as correspondence between the volumes and the physical disks 305, correspondence between the volumes and the volumes on the external storage apparatus 140, information concerning a copy destination and a copy source of data of the volumes, and an allocation state to the host computer 100 and transmits the configuration information to the management software 161 according to a request from the management software 161 on the management server 160. In some case, the micro program 121 adopts a form of periodically notifying the management software 161 of the configuration information.

A micro program 141 which performs the same processing as that of the micro program 121 of the storage apparatus 120 runs on the external storage apparatus 140. The micro program 141 stores configuration information in a management information table 142.

Figure 4:
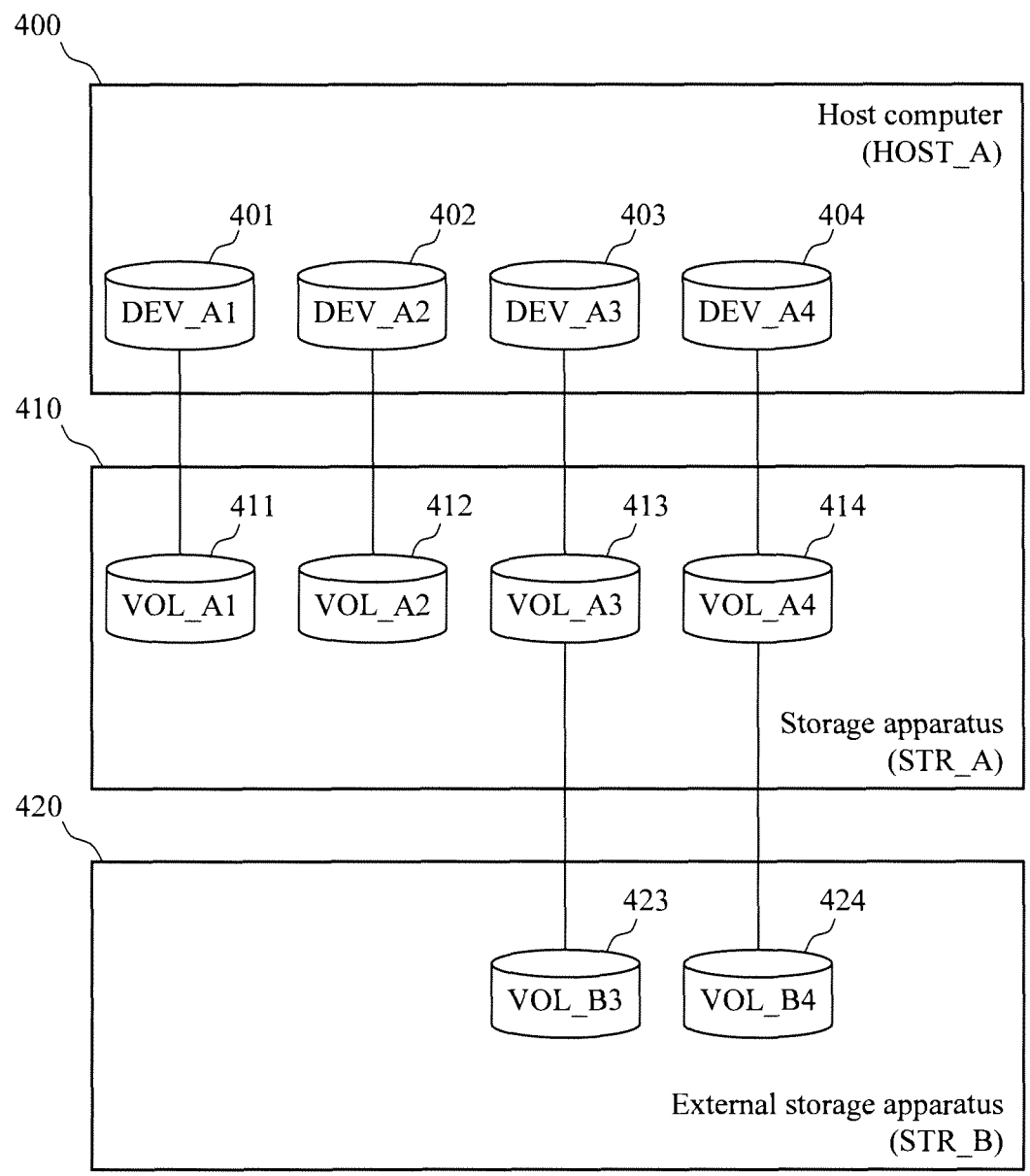
FIG. 4 is a conceptual diagram showing an example of a correspondence relation between volumes seen on the host computer and volumes on the storage apparatus and the external storage apparatus.

Correspondence Relation Example (1) between the Host Computer and the Storage Apparatus FIG. 4 is a conceptual diagram showing an example of a correspondence relation between the volumes provided by the storage apparatus 120 and the external storage apparatus 140 and the volumes seen on the host computer. In FIG. 4, an external storage apparatus 420 having a storage apparatus ID "STR_B" is coupled to a storage apparatus 410 and volumes having storage volume IDs "VOL_B3" 423 and "VOL_B4" 424 are allocated to the storage apparatus 410 having a storage apparatus ID "STR_A".

These volumes are given storage volume IDs "VOL_A3" 413 and "VOL_A4" 414 and managed on the storage apparatus 410. The storage apparatus 410 is coupled to a host computer 400 having a host ID "HOST_A" and volumes having storage volume IDs "VOL_A1" 411, "VOL_A2" 412, "VOL_A3" 413, and "VOL_A4" 414 are allocated to the host computer 400. Further, on the host computer 400, these volumes are respectively given host device IDs "DEV_A1" 401, "DEV_A2" 402, "DEV_A3" 403, and "DEV_A4" 404 and managed.

Example (1) of Configuration Information

FIG. 5 is a diagram showing examples of configuration information stored in management information tables of the host computer 400, the storage apparatus 410, and the external storage apparatus 420 when there is the correspondence relation shown in FIG. 4.

(i) Example of a Host Configuration Information Table

FIG. 5(a) shows an example of a host configuration information table 500a stored by the host computer (HOST_A) 400. The host configuration information table 500a includes, as configuration items, a host device ID 501a, a storage apparatus ID 502a, a storage volume ID 503a, a capacity 504a, and a used capacity 505a. However, since these kinds of information are information necessary enough to explain the embodiments of the present invention, configuration items are not limited to these configuration items. The table actually includes more kinds of configuration information.

The storage apparatus ID 502a is information managed by the storage apparatus 410. However, the storage apparatus ID 502a can be acquired from the host computer 400 using, for example, "SCSI Inquiry", which is one of SCSI commands.

The storage volume ID 503a is an identifier given to volumes by the storage apparatus 410 to manage the volumes. The storage volume ID 503a can also be acquired using "SCSI Inquiry".

Rows 511a to 514a indicate an example of values actually set. For example, it is seen from the row 511a that a device having the host device ID "DEV_A1" 401 on the host computer 400 corresponds to a volume having the storage volume ID "VOL_A1" 411 on the storage apparatus 410 having the storage apparatus ID "STR_A". It is seen that VOL_A1 has a capacity of 10 GB and 5 GB of 10 GB is used.

(ii) Example of a Storage Configuration Information Table

FIG. 5(b) shows an example of a storage configuration information table 500b stored by the storage apparatus 410. The table includes, as configuration items, a storage volume ID 501b, an external storage apparatus ID 502b, an external storage volume ID 503b, a capacity 504b, and a RAID group 505b. However, since these kinds of information are information necessary enough to explain the embodiments of the present invention, configuration items are not limited to these configuration items. The table actually includes more kinds of configuration information.

The external storage apparatus ID 502b is information corresponding to the storage apparatus ID managed by the external storage apparatus 420. This information can be acquired from the storage apparatus 410 using, for example, "SCSI Inquiry", which is one of SCSI commands.

The external storage volume ID 503b is information corresponding to the storage volume ID given to the volumes by the external storage apparatus 420 to manage the volumes. This information can also be acquired from the storage apparatus 410 using "SCSI Inquiry".

The RAID group 505b indicates, when volumes are RAID-configured using the physical disks 305 in the storage apparatus 410, from which RAID group the volumes are sliced. When entities of the volumes are present on another storage apparatus according to an external storage coupling function, information is not stored in the RAID group 505b.

Rows 511b to 514b indicate an example of values actually set. For example, it is seen from the row 513b that a volume having the storage volume ID "VOL_A3" 413 on the storage apparatus 410 corresponds to a volume having the storage volume ID "VOL_B3" 423 on the external storage apparatus 420 having the storage apparatus ID "STR_B". It is seen that a capacity of VOL_B3 is 50 GB.

(iii) Example of the Storage Configuration Information Table of the External Storage Apparatus FIG. 5(c) shows an example of the storage configuration information table 500b stored by the external storage apparatus 420. The table includes, as configuration items, a storage volume ID 501b, a capacity 504b, and a RAID group 505b. However, since these kinds of information are information necessary enough to explain the embodiments of the present invention, configuration items are not limited to these configuration items. The table actually includes more kinds of configuration information.

When there is no external storage coupling function as in the external storage apparatus 420, the table 500b does not have an area for storing the external storage apparatus ID 502b and the external storage volume ID 503b.

Rows 511c and 512c indicate an example of values actually set. For example, it is seen from the row 511c that a volume having the storage volume ID "VOL_B3" 423 on the external storage apparatus 420 has a capacity of 50 GB and is sliced from a RAID group "RG_B1".

Figure 6:
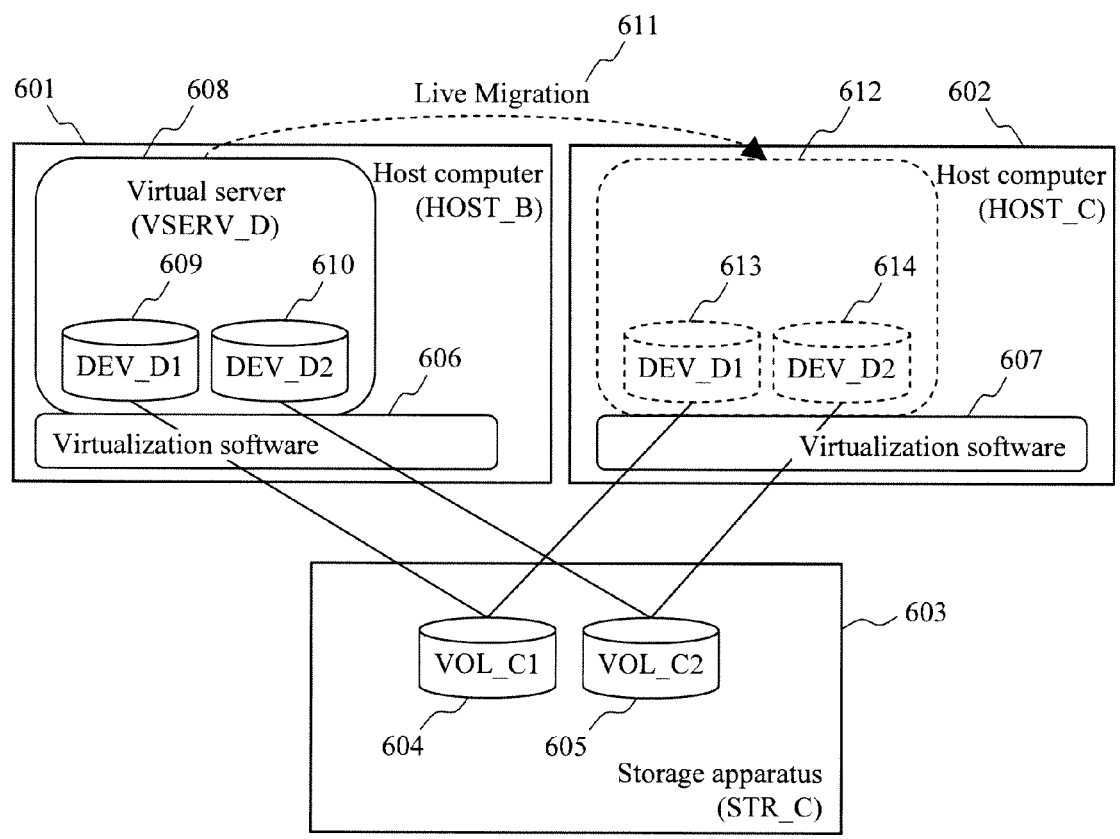
FIG. 6 is a conceptual diagram showing an example of a correspondence relation between volumes seen on the host computers and volumes of the storage apparatus.

Correspondence Relation Example (2) Between the Host Computer and the Storage Apparatus FIG. 6 is a conceptual diagram showing an example of a correspondence relation between the volumes provided by the storage apparatus 120 and the volumes seen on the host computer 100.

In FIG. 6, a storage apparatus 603 is coupled to a host computer 601 having a host ID "HOST_B" and a host computer 602 having a host ID "HOST_C". Volumes having storage volume IDs "VOL_C1" 604 and "VOL_C2" 605 are allocated to both of the host computer 601 and the host computer 602.

Virtualization software 606 is running on the host computer 601. Host device IDs "DEV_D1" 609 and "DEV_D2" 610 are respectively given to these volumes. These devices are allocated to a virtual server 608 to which a virtual server ID "VSERV_D" is given.

Similarly, virtualization software 607 is running on the host computer 602. For example, when a failure occurs in the virtual server 608 running on the host computer 601 or the host computer 601, it is set by a cluster function of the virtualization software to make it possible to transfer an operation state of the virtual server to the host computer 602 (Live Migration 611).

In this way, even when the virtual server 608 moves to the host computer 602, a volume used by the virtual server 608 is allocated from the storage apparatus 603 to the host computer 602, the virtualization software 606 and the virtualization software 607 of both the host computers cooperate with each other, and the same host device ID is given on the host computer 602 such that the same device can be used.

Example (2) of the Configuration Information

FIG. 7 is a diagram showing examples of configuration information stored in the management information tables of the host computer 601, the host computer 602, and the storage apparatus 603 when there is the correspondence relation shown in FIG. 6.

(i) Example of a Cluster Host Information Table of the Host Computer HOST_B

FIG. 7(a) shows an example of a cluster host information table 700a stored by the host computer 601. The table includes, as a configuration item, a cluster host ID 701a which stores a host ID of a host computer included in a cluster to which the own host computer belongs.

For example, it is seen from a row 711a that the host computer (HOST_B) 601 configures a cluster together with the host computer 602 having the host ID "HOST_C".

(ii) Example of a Host Configuration Information Table of the Host Computer HOST_B FIG. 7(b) shows an example of the host configuration information table 500a stored by the host computer 601. In the case of the relation shown in FIG. 6, the host configuration information table 500a includes, in addition to the case shown in FIG. 4, an allocation destination virtual server ID 701b which indicates to which virtual server a volume is allocated, as a configuration item.

Rows 711b and 712b indicate an example of values actually set. For example, it is seen from the row 711b that a device having the host device ID "DEV_D1" 609 of the host computer 601 corresponds to a volume having the storage volume ID "VOL_C1" 604 on the storage apparatus 603 having the storage apparatus ID "STR_C". It is seen that VOL_C1 has a capacity of 10 GB and is allocated to the virtual server 608 having the virtual server ID "VSERV_D".

(iii) Example of a Cluster Information Table of the Host Computer HOST_C

FIG. 7(c) shows an example of a cluster host information table 700a stored by the host computer 602. Like FIG. 7(a), the table includes, as a configuration item, a cluster host ID 701a which stores host ID of a host computer included in a cluster to which the own host computer belongs.

For example, it is seen from a row 711c that the host computer (HOST_C) 602 configures a cluster together with the host computer 601 having the host ID "HOST_B".

(iv) Example of a Host Configuration Information Table of the Host Computer HOST_C FIG. 7(d) shows an example of a host configuration information table 500a stored by the host computer 602. Types of information stored by the table are the same as the information of the host configuration information table (FIG. 7(b)) stored by the host computer 601.

Rows 711d and 712d indicate an example of values actually set. For example, it is seen from the row 711d that a device having the host device ID "DEV_D1" 613 of the host computer 602 corresponds to a volume having the storage volume ID "VOL_C1" 604 on the storage apparatus 603 having the storage apparatus ID "STR_C". It is seen that VOL_C1 has a capacity of 10 GB. Unlike the case of the host computer 601, since the virtual server 608 is not running on the host computer 602, a value is not set in the allocation destination virtual server ID 701b.

(v) Example of a Storage Configuration Information Table of the Storage Apparatus FIG. 7(e) shows an example of the storage configuration information table 500b stored by the storage apparatus 603. Information of rows in the table is the same as the information in the storage configuration information table 500b shown in FIG. 5(b). However, in the case of the correspondence relation shown in FIG. 6, since the external storage apparatus is not coupled to the storage apparatus 603, the table shown in FIG. 7(e) does not store the external storage apparatus ID 502b and the external storage volume ID 503b.

Rows 711e and 712e indicate an example of values actually set. For example, it is seen from the row 711e that a volume having the storage volume ID "VOL_C1" 605 on the storage apparatus 603 has a capacity of 10 GB and is sliced from a RAID group "RG_C1".

Figure 8:
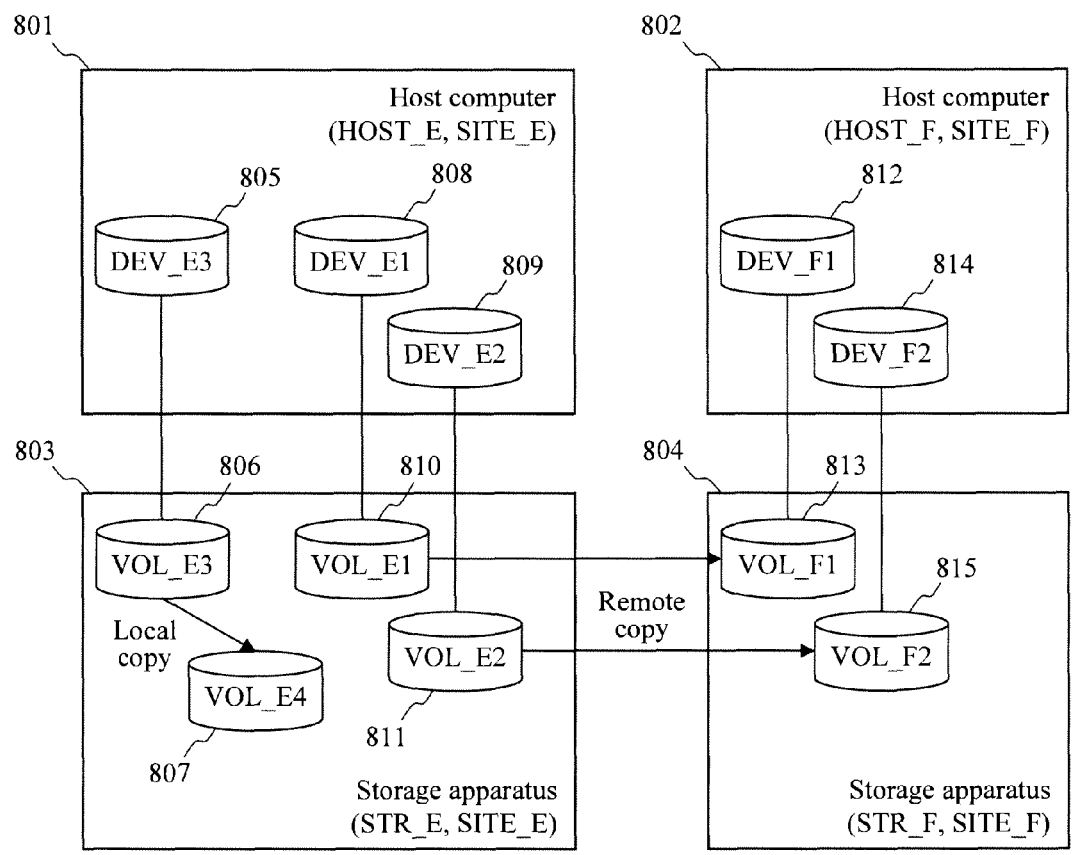
FIG. 8 is a conceptual diagram showing an example of a correspondence relation between volumes seen on the host computers and volumes of the storage apparatuses.

Correspondence Relation Example (3) Between the Host Computer and the Storage Apparatus FIG. 8 is a conceptual diagram showing an example of a correspondence relation between volumes provided by storage apparatuses 803 and 804 and volumes seen on host computers 801 and 802.

In FIG. 8, the storage apparatus 803 is coupled to the host computer (HOST_E) 801 having a host ID "HOST_E". Volumes having storage volume IDs "VOL_E1" 810, "VOL_E2" 811, and "VOL_E3" 806 are allocated to the host computer 801. On the host computer 801, host device IDs "DEV_E1" 808, "DEV_E2" 809, and "DEV_E3" 805 are respectively given to these volumes to manage the volumes.

The storage apparatus 803 has the local copy function. In FIG. 8, a volume having a storage volume ID "VOL_E3" 806 is copied to a volume having a storage volume ID "VOL_E4" 807.

Further, the storage apparatus 803 has the remote copy function. In FIG. 8, a volume having a storage volume ID "VOL_E1" 810 is copied to a volume having a storage volume ID "VOL_F1" 813 on the storage apparatus 804 having a storage apparatus ID "STR_F". Similarly, a volume having a storage volume ID "VOL_E2" 811 is copied to a volume having a storage volume ID "VOL_F2" 815 on the storage apparatus 804 having the storage apparatus ID "STR_F".

Further, in FIG. 8, the storage apparatus 804 is coupled to the host computer 802 having the host ID "HOST_F". The volumes having the storage volume IDs "VOL_F1" 813 and "VOL_F2" 815 are allocated to the host computer 802. On the host computer 802, the host device IDs "DEV_F1" 812 and "DEV_F2" 814 are respectively given to these volumes to manage the volumes.

A site ID "SITE_E" indicating a physical and geographical setting location is given to the host computer 801 and the storage apparatus 803. A site ID "SITE_F" is given to the host computer 802 and the storage apparatus 804. An administrator may give the site IDs to the host computers and the storage apparatuses. Higher-order bits (a network section) of an IP address given when the host computers and the storage apparatuses are coupled to the management LAN 170 may be used or a domain name corresponding to the IP address may be used. The site is, for example, a concept equivalent to one data center including plural instances (management servers).

Example (3) of the Configuration Information

FIG. 9 is a diagram showing examples of configuration information stored in management information tables of the host computer 801, the host computer 802, the storage apparatus 803, and the storage apparatus 804 when there is the correspondence relation shown in FIG. 8.

(i) Example of the Host Configuration Information Table of HOST_E

FIG. 9(a) shows an example of the host configuration information table 500a stored by the host computer 801. Configuration items of the table are the same as those of the table shown in FIG. 5(a).

Rows 911a to 913a indicate an example of values actually set. For example, it is seen from the row 911a that a device having the host device ID "DEV_E1" 808 of the host computer 801 corresponds to a volume having the storage volume ID "VOL_E1" 810 on the storage apparatus 803 having the storage apparatus ID "STR_E". It is seen that VOL_E1 has a capacity of 30 GB and 25 GB of 30 GB is used.

(ii) Example of the Host Configuration Information Table of HOST_F

FIG. 9(b) shows an example of the host configuration information table 500a stored by the host computer 802. Configuration items of the table are the same as those of the table shown in FIG. 5(a).

Rows 911b and 912b indicate an example of values actually set. For example, it is seen from the row 911b that a device having the host device ID "DEV_F1" 812 of the host computer 802 corresponds to a volume having the storage volume ID "VOL_F1" 813 on the storage apparatus 804 having the storage apparatus ID "STR_F". It is seen that VOL_F1 has a capacity of 30 GB and 25 GB of 30 GB is used.

(iii) Example of the Storage Configuration Information Table of STR_E

FIG. 9(c) shows an example of the storage configuration information table 500b stored by the storage apparatus 803. The table stores configuration information obtained when the copy function is provided as in the storage apparatus 803 and the function is used. The table includes, as configuration items, a primary volume ID 901c which stores a volume ID of a copy source of data, a secondary volume ID 902c which stores a volume ID of a copy destination of the data, a copy type 903c indicating a type of the copy, and a remote storage apparatus ID 904c indicating a storage apparatus in which volumes of the copy source and destination of the data are present in the case of the remote copy.

In FIG. 9(c), in the copy type 903c, for example, a character string "RC" is set in the case of the remote copy and a character string "LC" is set in the case of the local copy. Since the storage apparatus 803 does not have the external storage coupling function, the storage apparatus 803 does not store the external storage apparatus ID 502b and the external storage volume ID 503b.

Rows 911c to 914c indicate an example of values actually set. For example, it is seen from the row 911c that a volume having the storage volume ID "VOL_E1" 810 on the storage apparatus 803 has a capacity of 30 GB and is sliced from a RAID group "RG_E1". It is seen that data in the volume is remote-copied to the storage volume ID "VOL_F1" 813 present on the storage apparatus 804 having the storage apparatus ID "STR_F".

For example, it is seen from the row 913c that a volume having the storage volume ID "VOL_E3" 806 on the storage apparatus 803 has a capacity of 40 GB and sliced from a RAID group "RG_E3". Further, it is seen that data in the volume is local-copied to a storage volume ID "VOL_E4" 807.

(iv) Example of the Storage Configuration Information Table of STR_F

FIG. 9(d) is an example of the storage configuration information table 500b stored by the storage apparatus 804. A type of information stored by the table is the same as the information stored by the storage apparatus 803.

Rows 911d and 912d indicate an example of values actually set. For example, it is seen from the row 911d that a volume having the storage volume ID "VOL_F1" 813 on the storage apparatus 804 has a capacity of 30 GB and is sliced from a RAID group "RG_F1". It is seen that data in the volume is remote-copied from the storage volume ID "VOL_E1" 810 present on the storage apparatus 803 having the storage apparatus ID "STR_E".

Configuration Example of a Member Instance Table

FIG. 10 is a diagram showing a configuration example of a member instance table 1000a which is stored as a part of the management information table 165 by member instances and shows a list of the member instances and other member instances.

The member instance table 1000a includes, as configuration items, for example, a member instance ID 1001a which is an identifier (identification information) of a member instance, an IP address 1002a of the member instance, and a site ID 1003a indicating a setting place of the member instance. Information included in the member instance table 1000a is stored as a part of the management information table 165 by the instance cooperation programs 166 of the instances cooperating with one another and synchronizing the same information among all the member instances. Therefore, for example, a form is adopted in which the administrator registers information of all the member instances in any one member instance and the instance cooperation program 166 of the member instance in which the administrator registers the information delivers the information to the instance cooperation programs 166 of the other member instances. Alternatively, as in a method used in a DNS (domain name system), a form may be adopted in which the administrator registers only a part of information in the member instances and the instance cooperation programs 166 of the member instances notifies the information one another.

The administrator may give the site ID 1003a to the member instances when the administrator registers the information of the member instances. Higher-order bits (a network section) of an IP address of a member instance may be used or a domain name corresponding to the IP address may be used. The site ID 1003a does not always need to be given. For example, when setting places of the member instances are the same (e.g., when all the member instances are present in the same data center), the site ID 1003a does not have to be registered as in a row 1011a.

Concerning the member instances to which the site ID 1003a is given, processing for distributing management target objects to the instances is executed taking a site into account. However, concerning the instances to which sites are not given, processing for distributing to the instances is executed assuming that all the instances are present in the same site.

Configuration Example of a Management Target Table

In order to execute the distribution processing and in order to acquire configuration information from management target objects after the distribution processing, the instances need to grasp in advance what kind of objects should be set as management targets. Therefore, the instances store a management target table in synchronization with one another. This is for the purpose of making it possible to deal with the management object table irrespective of which instance is set as a representative instance explained later.

FIG. 11 is a diagram showing a configuration example of the management target table stored by the member instances. As shown in FIG. 11, the member instances store, in a part of the management information table 165, as a management target table 1100, information concerning all the host computers 100, the storage apparatuses 120, the external storage apparatuses 140, and the like set as management targets.

The management target table 1100 includes, as configuration information, for example, a management target IP address 1101 which stores an IP address on a management LAN and a management target type 1102 representing types of management targets. The management target table 1100 includes sets of the administration target IP address 1101 and the management target type 1102 equivalent to the number of the host computers 100, the storage apparatuses 120, and the external storage apparatuses 140 set as the management targets.

Like the information of the member instance table 1000a (FIG. 10), information of the management target table 1100 is stored by the instance cooperation programs 166 of the instances cooperating with one another and synchronizing the same information among all the member instances. As a method of synchronizing the information, the same method as the method in the case of the member instance table 1000a is used.

The management target table 1100 shown in FIG. 11 includes minimum information (places and types) required by the representative instance for the distribution processing. The instances directly acquire detailed configuration information from the host computers 100, the storage apparatuses 120, and the external storage apparatuses 140 after the distribution processing. Consequently, it is possible to reduce an information amount of the management target table 1100 stored by the instances and reduce loads on the instances.

Configuration Example of an Aggregation Priority Table

Figures 12, 13:
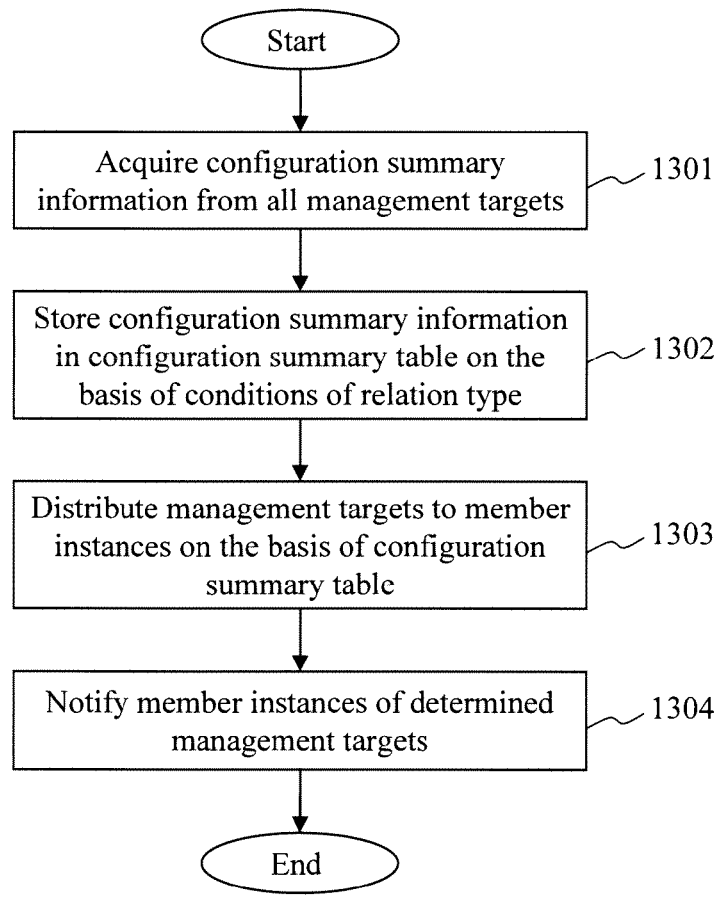
FIG. 12 is a diagram showing an example of an aggregation priority table stored as a part of the management information table by the management software on the management server in the present invention.
FIG. 13 is a flowchart for explaining an overview of a processing operation in which the management software on the management server in the present invention distributes management targets to member instances.

FIG. 12 is a diagram showing a configuration example of an aggregation priority table stored by the member instances. As shown in FIG. 12, the member instances stores, as a part of the management information table 165, an aggregation priority table 1200 showing priority in distribution of management target objects (the devices on the host computer 100 and the volumes on the storage apparatus 120 and the external storage apparatus 140).

The aggregation priority table 1200 includes, for example, priority 1201 and a relation type 1202 as configuration information. The priority 1201 is information concerning priority which should be taken into account in the distribution processing. The relation type 1202 is information indicating what kinds of relations among objects are aggregated in one member instance. The relation type 1202 is the same as relation types 1404a, 1404b, and 1502a of configuration summary information explained later as a set character string. Information of the priority 1201 and the relation type 1202 may be stored in advance in the instances or may be set by the administrator. When the information is stored in advance, the information may be changeable by the administrator.

Like the information of the member instance table 1000a, the information of the aggregation priority table 1200 is stored by the instance cooperation programs 166 of the instances cooperating with one another and synchronizing the same information among all the member instances. As a method of synchronizing the information, the same method as the method in the case of the member instance table 1000a is used.

The highest priority is set concerning the LC because it is determined highly likely that management inoperability is caused unless volumes of a copy source and a copy destination are distributed (allotted) to the same instance and managed. However, it is possible to set the priority of not only the LC but also another relation type to the highest.

Overview of the Distribution Processing

FIG. 13 is a flowchart for explaining an overview of the distribution processing according to the present invention. The distribution processing is executed by a representative instance in plural instances. Therefore, first, the instance cooperation program 166 of the management software 161 determines an instance serving as a representative among member instances (hereinafter referred to as "representative instance"). As the determination of the representative instance, for example, a form in which the administrator selects any one of the member instances may be adopted or a method similar to arbitration (processing in which, when there are plural paths, switches arbitrate and determine a path) used in, for example, path control for a network.

After the determination of the representative instance, the management target determination program 162 of the member instance set as the representative instance distributes management targets to the instances according to the flowchart of FIG. 13. Only an overview of the processing is explained below and details of processing in steps are explained later with reference to the drawings.

Step 1301: the representative instance accesses all management targets included in the management target table 1100 and acquires, as configuration summary information, information including identifiers of the management targets (host IDs in the case of the host computers, storage apparatus IDs in the case of the storage apparatuses, and external storage apparatus IDs in the case of the external storage apparatuses) and site IDs. The configuration summary information is information necessary for the distribution processing and is information indicating a correspondence relation among management target objects and a type of the correspondence relation.

Step 1302: the representative instance stores the acquired configuration summary information in a configuration summary table 1700. Details of the processing are explained using FIG. 21.

Step 1303: the representative instance distributes the management target objects to the member instances on the basis of the configuration summary table 1700. Details of the processing are explained using FIG. 22.

Step: 1304 the representative instance notifies the member instances of the management target objects distributed to the member instances. Details of the processing are explained using FIG. 25.

Example of the Configuration Summary Information

FIGS. 14 to 16 are diagrams showing examples of the configuration summary information acquired from the host computer 100, the storage apparatus 120, and the external storage apparatus 140 in step 1301. As the configuration summary information, only necessary minimum information is acquired in order to distribute the management target objects to the member instances. Consequently, it is possible to reduce a load on the management server 160 due to the acquisition processing and time required for the acquisition. The management target determination program 162 requests the management agent 101 on the host computer 100, the micro program 121 of the storage apparatus 120, and the micro program 141 of the external storage apparatus 140 to acquire the configuration summary information.

(i) Example of Configuration Summary Information Acquired When There is the Correspondence Relation Shown in FIG. 4 (FIG. 14)

FIG. 14 is a diagram showing examples of configuration summary information acquired by the management target determination program 162 when there is the correspondence relation shown in FIG. 4.

FIG. 14(a) is an example of host configuration summary information 1400a acquired from the host computer 400. The host configuration summary information 1400a includes, as configuration items, a host device ID 1401a, a related storage apparatus ID 1402a, a related storage volume ID 1403a, and a relation type 1404a.

The host device ID 1401a, the related storage apparatus ID 1402a, and the related storage volume ID 1403a are the same information as the host device ID 501a, the storage apparatus ID 502a, and the storage volume ID 503a of the host configuration information table 500a, respectively.

The relation type 1404a is information representing what causes correspondence relations indicated in rows 1411a to 1414a. When the relation type 1404a represents correspondence between the volumes seen on the host computer 100 and the volumes provided by the storage apparatus 120 (it can be said that the correspondence is, for example, "direct coupling relation", "direct correspondence relation", or "direct provision relation"), for example, a character string "MAP" is set.

The host configuration summary information 1400a does not include other information such as the capacity 504a and the used capacity 505a in the host configuration information table 500a.

FIGS. 14(b) and 14(c) show examples of storage configuration summary information 1400b acquired from the storage apparatus 410 and the external storage apparatus 420, respectively. The storage configuration summary information 1400b includes, as configuration items, a storage volume ID 1401b, a related storage apparatus ID 1402b, a related storage volume ID 1403b, a relation type 1404b.

The storage volume ID 1401b, the related storage apparatus ID 1402b, and the related storage volume ID 1403b are the same information as the storage volume ID 501b, the external storage apparatus ID 502b, and the external storage volume ID 503b of the storage configuration information table 500b, respectively.

In the relation type 1404a, for example, as indicated by a row 1413b, a character string "EXT" representing a relation of external storage coupling is set.

In the case of volumes managed on the inside of the storage apparatus 410 and the external storage apparatus 420 such as a volume having the storage volume ID "VOL_A1" 411 and a volume having the storage volume ID "VOL_B3" 423, information is not set in the related storage apparatus ID 1402b, the related storage volume ID 1403b, and the relation type 1404a. Other information such as the capacity 504b and the RAID group 505b in the storage configuration information table 500b is not included in the storage configuration summary information 1400a.

(ii) Example of Configuration Summary Information Acquired When There is the Correspondence Relation Shown in FIG. 6 (FIG. 15)

FIG. 15 is a diagram showing an example of configuration summary information acquired by the management target determination program 162 when there is the correspondence relation shown in FIG. 6.

FIGS. 15(b) and 15(c) are host configuration summary information 1400a acquired from the host computers 601 and 602, respectively. Contents of the information are the same as those in the case of FIG. 14(a). In the case of FIG. 6, in addition to the information, cluster configuration summary information 1500a shown in FIGS. 15(a) and 15(b) is acquired from the host computers 601 and 602.

FIG. 15(a) is the cluster configuration summary information 1500a acquired from the host computer 601. The cluster configuration summary information 1500a includes a related host ID 1501a and a relation type 1502a as configuration items. The related host ID 1501a is the same information as the cluster host ID 701a of the cluster configuration information table 700a. The relation type 1502a indicates a relation to a host computer indicated by the cluster host ID 1101a. In this case, for example, a character string "CLUSTER" representing a cluster is set.

FIG. 15(e) is storage configuration summary information 1400b acquired from the storage apparatus 603. Contents of the information are the same as those in the case of FIG. 14(b).

(iii) Example of Configuration Summary Information Acquired When There is the Correspondence Relation Shown in FIG. 8 (FIG. 16)

FIG. 16 is a diagram showing an example of configuration summary information acquired by the management target determination program 162 when there is the correspondence relation shown in FIG. 8.

FIGS. 16(a) and 16(b) are host configuration summary information 1400a acquired from the host computer 801 and the host computer 802, respectively. Contents of the information are the same as those in the case of FIG. 14(a).

FIGS. 16(c) and 16(d) are storage configuration summary information 1400b acquired from the storage apparatus 803 and the storage apparatus 804, respectively. The same information as the remote storage apparatus ID 904c of the storage configuration information table 500b is set in the related storage apparatus ID 1402b. The primary volume ID 901c or the secondary volume ID 902c including information in the storage configuration information table 500b is set in the related storage volume ID 1403b.

When the relation type 1404b represents the remote copy, for example, as in a row 1211c, for example, a character string "RC" is set. Similarly, in the case of the local copy, for example, as in a row 1213c, for example, a character string "LC" is set.

Configuration Example of the Configuration Summary Table

FIGS. 17 to 20 are diagrams showing examples of the configuration summary table 1700 in which the management target determination program 162 of the representative instance stores the acquired configuration summary information in step 1302. The configuration summary table 1700 is stored as a part of the management information table 165. The configuration summary table 1700 is a table for analyzing the configuration summary information (FIGS. 14 to 16) and distributing (allotting) management target objects to instances. Therefore, it can be said that the configuration summary table 1700 is a configuration summary analysis table.

The configuration summary table 1700 includes, as configuration items, a site ID 1701, primary 1711, secondary 1712, and the number of objects 1708. Each of the primary 1711 and the secondary 1712 includes, as detailed items, a host ID 1702, a host device ID 1703, a storage apparatus ID 1704, a storage volume ID 1705, an external storage apparatus ID 1706, and an external storage volume ID 1707.

In the host ID 1702, a host ID acquired together with the host configuration summary information 1000a when the host configuration summary information 1000a is acquired is set. The host ID is set in the primary 1711 or the secondary 1712 according to order of processing the host configuration summary information 1400a acquired from the host computers 100. However, the host ID may be set in either the primary 1711 or the secondary 1712.

In the host device ID 1703, information of the host device ID 1401a of the host configuration summary information 1400a is set.

In the storage apparatus ID 1704 and the external storage apparatus ID 1706, information of the related storage apparatus ID 1402b of the storage configuration summary information 1400b is set. For example, when the relation type 1404b of the storage configuration summary information 1400b is "RC" or "LC", the information of the related storage apparatus ID 1402b is set in the storage apparatus ID 1704.

When the relation type 1404b is "EXT", the information of the related storage apparatus ID 1402b is set in the external storage apparatus ID 1706.

Similarly, in the storage volume ID 1705 and the external storage volume ID 1707, information of the related storage volume ID 1403b of the storage configuration summary information 1400b is set. For example, when the relation type 1004b of the storage configuration summary information 1000b is "RC" or "LC", the information of the related storage volume ID 1403b is set in the storage volume ID 1705. When the relation type 1004b is "EXT", the information of the related storage volume ID 1403b is set in the external storage volume ID 1707.

Processing for Storage in the Configuration Summary Table: Details of Step 1302

Figure 21:
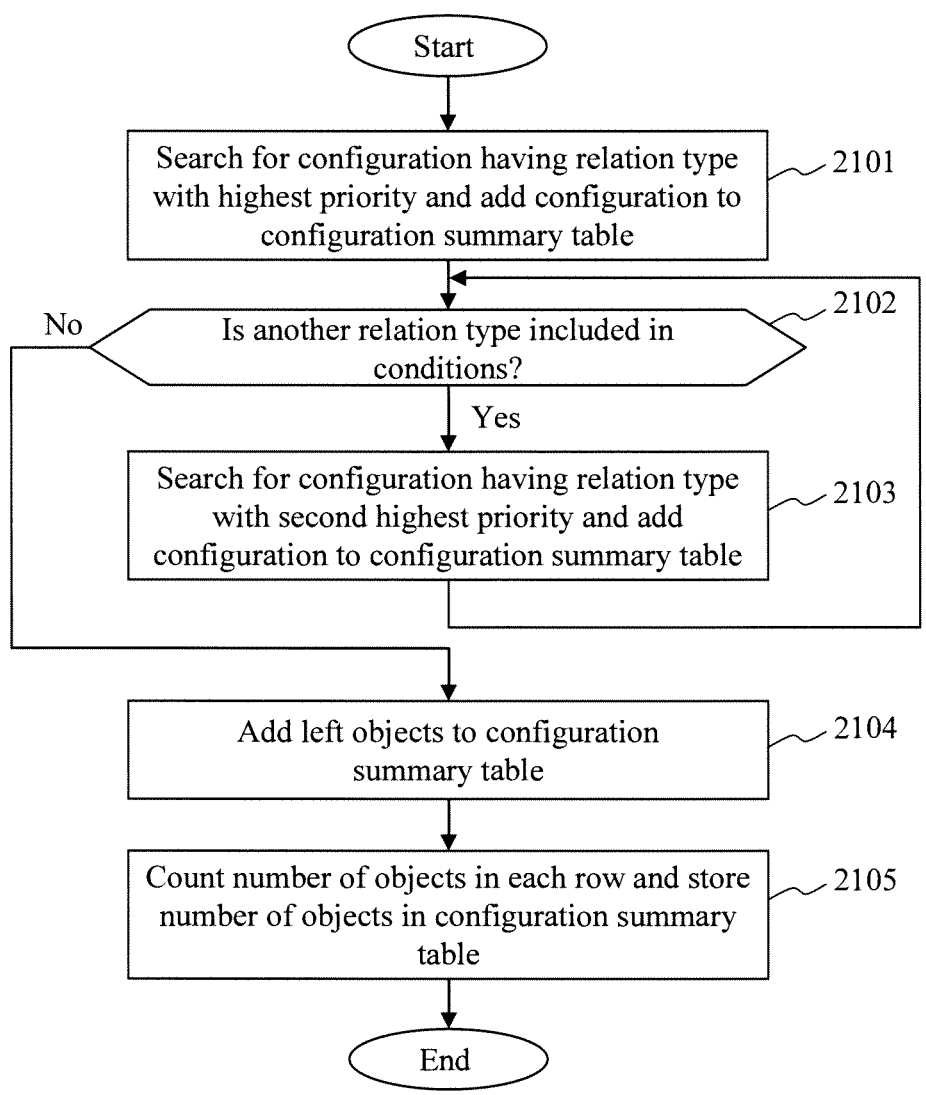
FIG. 21 is a flowchart for explaining details of a processing operation in which the management software on the management server in the present invention stores configuration summary information in the configuration information summary table.

FIG. 21 is an example of a flowchart for explaining details of the processing for storing configuration summary information acquired by the management target determination program 162 of the representative instance in the configuration summary table 1700 executed in step 1302. A blank configuration summary table 1700 is prepared in advance. Processing for setting information in relevant spaces of the table 1700 is executed according to the configuration summary information (FIGS. 14 to 16). The processing is not limited to such a method of filling information in the relevant spaces of the table. It is not always necessary to use a table format as long as the processing is a method of clearly showing a correspondence relation among objects (e.g., a method of showing the correspondence information in a tree structure). Therefore, it should be noted that the following explanation is only a processing example performed when the table format is used and does not limit the present invention.

(i) Step 2101

The management target determination program 162 of the representative instance extracts, from the acquired configuration summary information, a configuration corresponding to the relation type 1402 having the highest priority in the aggregation priority table 1200 and stores the configuration in the configuration summary table 1700.

For example, when the aggregation priority table 1200 stores the information shown in FIG. 12, the relation type "LC" having the highest priority is extracted from a row 1211. When the configuration summary information shown in FIGS. 14 to 16 is acquired, a configuration in which "LC" is set in the relation types 1404a, 1404b, and 1502a, i.e., a row 1613c and 1614c are extracted (see FIG. 16) and stored in the configuration summary table 1700.

In this case, the storage volume ID 1401b is stored in the storage volume ID 1705 on the primary 1711 side and the related storage volume ID 1403b is stored in the storage volume ID 1705 on the secondary 1712 side or may be vice versa. However, a storage apparatus ID acquired according to the acquisition time of the configuration summary information is stored in the respective storage apparatus IDs 1704. When a site ID is acquired together with relevant configuration summary information when the configuration summary information is acquired, the site ID is set in the site ID 1701.

When a relation type having the highest priority is "RC" (see FIG. 16), a row 1611c and a row 1614c are extracted and stored in the configuration summary table 1700. In this case, the storage volume ID 1401b is stored in the storage volume ID 1705 on the primary 1711 side and the related storage apparatus ID 1402b and the related storage volume ID 1403b are stored in the storage apparatus ID 1704 and the storage volume ID 1705 on the secondary 1712 side or may be vice versa. However, a storage apparatus ID acquired according to the acquisition time of the configuration summary information is stored in the storage apparatus ID 1704 on a side on which the storage volume ID 1401b is stored. When a site ID is acquired together with relevant configuration summary information when the configuration summary information is acquired, the site ID is set in the site ID 1701.

Further, when a relation type having the highest priority is "EXT" (see FIG. 14), a row 1413b and a row 1414b are extracted and stored in the configuration summary table 1700. In this case, the storage volume ID 1401b is stored in the storage volume ID 1705 on the primary 1711 side and the related storage apparatus ID 1402b and the related storage volume ID 1403b are stored in the external storage apparatus ID 1706 and the external storage volume ID 1707 on the primary 1711 side or may be stored on the secondary 1712 side. However, a storage apparatus ID acquired according to the acquisition time of the configuration summary information is stored in the storage apparatus ID 1704 on a side on which the storage volume ID 1401b is stored. When a site ID is acquired together with relevant configuration summary information when the configuration summary information is acquired, the site ID is set in the site ID 1701.

When a relation type having the highest priority is "MAP" (see FIG. 14), for example, a row 1411a and a row 1412b are extracted and stored in the configuration summary table 1700. In this case, the host device ID 1401a is stored in the host device ID 1703 on the primary 1711 side and the related storage apparatus ID 1402a and the related storage volume ID 1403a are stored in the storage apparatus ID 1704 and the storage volume ID 1705 on the primary 1711 side or may be stored on the secondary 1712 side. However, a host ID acquired according to the acquisition time of the configuration summary information is stored in the host ID 1702 on a side on which the host device ID 1401a is stored. When a site ID is acquired together with relevant configuration summary information when the configuration summary information is acquired, the site ID is set in the site ID 1701.

When a relation type having the highest priority is "CLUSTER" (see FIG. 15), for example, a row 1511a and a row 1511c are extracted and stored in the configuration summary table 1700. In this case, a row in which the related storage apparatus IDs 1402a and the related storage volume IDs 1403a respectively coincide with each other between the host configuration summary information 1400a acquired from the same host computer and the host configuration summary information 1400a acquired from the related host ID 1501a is extracted and set in the storage apparatus ID 1704 and the storage volume ID 1705 on the primary 1711 side or the secondary 1712 side. At this point, a corresponding host ID and the host device ID 1401a are set in the host ID 1702 and the host device ID 1703 on the primary 1711 side and the secondary 1712 side.

(ii) Step 2102

The management target determination program 162 checks whether the relation type 1202 having priority lower than the relation types processed so far is present in the aggregation priority table 1200. When the relation type 1202 having lower priority is present (Yes in step 2102), the processing shifts to step 2103. When the relation type 1202 having lower priority is not present (No in step 2102), the processing shifts to step 2104. For example, when the aggregation priority table 1200 stores the information shown in FIG. 12 and the relation type "LC" having the highest priority is processed in step 2101, the relation type "CLUSTER" having the second highest priority is extracted and the processing proceeds to step 2103.

(iii) Step 2103

The management target determination program 162 extracts, from the acquired configuration summary information, a configuration corresponding to the relation type 1202 extracted in step 2102 in the aggregation priority table 1200 and stores the configuration in the configuration summary table 1700. The processing shifts to step 2102. When the same storage volume ID as the related storage volume ID 1403a or 1403b included in information extracted at this point is already stored in the storage volume ID 1705 of the configuration summary table 1700, the storage volume ID is stored in a corresponding column of the same row.

For example, when "CLUSTER" is extracted in step 2102, the row 1511a and the row 1511c are extracted (see FIG. 15) and stored in the configuration summary table 1700. As in step 2101, the management target determination program 162 extracts a row in which the related storage apparatus IDs 1402a and the related storage volume IDs 1403a respectively coincide with each other between the host configuration summary information 1400a acquired from the same host computer and the host configuration summary information 1400a corresponding to the host computer of the related host ID 1501a. The management target determination program 162 sets the row in the storage apparatus ID 1704 and the storage volume ID 1705 on the primary 1711 side or the secondary 1712 side. However, when the same storage apparatus ID 1704 and the same storage volume ID 1705 are already present in the storage apparatus ID 1704 and the storage volume ID 1705 of the configuration summary table 1700, a corresponding host ID and the host device ID 1401a are set in the host ID 1702 and the host device ID 1703 in the same row.

For example, when "LC" is extracted in step 2102, the row 1613c and the row 1614c are extracted (see FIG. 16) and stored in the configuration summary table 1700. As in step 2101, the management target determination program 162 stores the storage volume ID 1401b in the storage volume ID 1705 on the primary 1711 side and stores the related storage volume ID 1403b in the storage volume ID 1705 on the secondary 1712 side or may be vice versa. However, a storage apparatus ID acquired according to the acquisition time of the configuration summary information is stored in the respective storage apparatus IDs 1704. When a site ID is acquired together with relevant configuration summary information when the configuration summary information is acquired, the information is set in the site ID 1701. When the same storage apparatus ID 1704 and the same storage volume ID 1705 are already present in the storage apparatus ID 1704 and the storage volume ID 1705 of the configuration summary table 1700, the management target determination program 162 stores the corresponding related storage apparatus ID 1402b and related storage volume ID 1403b in sections where values of the storage apparatus ID 1704 and the storage volume ID 1705 are not set in the same row.

For example, when "RC" is extracted in step 2102, the row 1611c and the row 1614c are extracted (see FIG. 16) and stored in the configuration summary table 1700. As in step 2101, the management target determination program 162 stores the storage volume ID 1401b in the storage volume ID 1705 on the primary 1711 side and stores the related storage apparatus ID 1402b and the related storage volume ID 1403b in the storage apparatus ID 1704 and the storage volume ID 1705 on the secondary 1712 side or may be vice versa. However, a storage apparatus ID acquired according to the acquisition time of the configuration summary information is stored in the storage apparatus ID 1704 on a side on which the storage volume ID 1001b is stored. When a site ID is acquired together with relevant configuration summary information when the configuration summary information is acquired, the information is set in the site ID 1701. When a value is set in the site ID 1701, the site ID 1701 may be overwritten or may be left as it is. When the same storage apparatus ID 1704 and the same storage volume ID 1705 are already present in the storage apparatus ID 1704 and the storage volume ID 1705 of the configuration summary table 1700, the management target determination program 162 stores the corresponding related storage apparatus ID 1402b and related storage volume ID 1403b in sections where values of the storage apparatus ID 1704 and the storage volume ID 1705 are not set in the same row.

Further, for example, when "EXT" is extracted in step 2102, the row 1413b and the row 1414b are extracted (see FIG. 14) and stored in the configuration summary table 1700. As in step 2101, the management target determination program 162 stores the storage volume ID 1401b in the storage volume ID 1705 on the primary 1711 side and stores the related storage apparatus ID 1402b and the related storage volume ID 1403b in the external storage apparatus ID 1706 and the external storage volume ID 1707 or may store the storage volume ID 1401b, the related storage apparatus ID 1402b, and the related storage volume ID 1403b on the secondary 1712 side. However, a storage apparatus ID acquired according to the acquisition time of the configuration summary information is stored in the storage apparatus ID 1704 on a side on which the storage volume ID 1001b is stored. When a site ID is acquired together with relevant configuration summary information when the configuration summary information is acquired, the information is set in the site ID 1701. When the same storage apparatus ID 1704 and the same storage volume ID 1705 are already present in the storage apparatus ID 1704 and the storage volume ID 1705 of the configuration summary table 1700, the management target determination program 162 sets the corresponding related storage apparatus ID 1402b and related storage volume ID 1403b in the external storage apparatus ID 1706 and the external storage volume ID 1707.

For example, when "MAP" is extracted in step 2102, the row 1411a and the row 1412b are extracted (see FIG. 14) and stored in the summary table 1700. As in step 2101, the management target determination program 162 stores the host device ID 1401a in the host device ID 1703 on the primary 1711 side and stores the related storage apparatus ID 1402a and the related storage volume ID 1403a in the storage apparatus ID 1704 and the storage volume ID 1705 on the primary 1711 side or may store the host device ID 1401a, the related storage apparatus ID 1402a, and the related storage volume ID 1403a on the secondary 1712 side. However, a host ID acquired according to the acquisition time of the configuration summary information is stored in the host ID 1702 on a side on which the host device ID 1401a is stored. When a site ID is acquired together with relevant configuration summary information when the configuration summary information is acquired, the information is set in the site ID 1701. When the same storage apparatus ID 1704 and the same storage volume ID 1705 are present in the storage apparatus ID 1704 and the storage volume ID 1705 of the configuration summary table 1700, the management target determination program 162 sets a host ID and the host device ID 1400a in the host ID 1702 and the host device ID 1703 on the same side.

(iv) Step 2104

The management target determination program 162 stores, in the configuration summary table 1700, a configuration not stored in the configuration summary table 1700 yet in the acquired configuration summary information. At this point, in the case of information extracted from the host configuration summary information 1400a, only a host ID and the host device ID 1401a acquired together with the information are stored in the host ID 1702 and the host device ID 1703. In the case of information extracted from the storage configuration summary information 1400b, only a storage apparatus ID and the storage volume ID 1400b acquired together with the information are stored in the storage apparatus ID 1704 and the storage volume ID 1705.

For example, when the information shown in FIG. 12 is stored as the aggregation priority table 1200 and the configuration summary information shown in FIG. 14 is acquired, the management target determination program 162 extracts the rows 1411b, 1412b, 1411c, and 1412c not having the relation type 1404a or 1404b. When the information is stored, the information is stored in new rows of the configuration summary table 1700.

When the configuration summary information shown in FIG. 16 is acquired, since "RC" is not present in the aggregation priority table 1200, the management target determination program 162 extracts the rows 1611c and 1612c. Concerning the rows, the management target determination program 162 discards the related storage apparatus ID 1420b and the related storage volume ID 1403b and stores, in a new row of the configuration summary table 1700, the storage apparatus ID and the storage volume ID 1401b acquired together with the configuration summary information when the configuration summary information is acquired.

(v) Step 2105

Concerning the rows of the configuration summary table 1700, the management target determination program 162 counts the number of objects and stores the number of objects in the number of objects 1708 row. The number of objects is calculated as, for example, the number of columns of the host device ID 1703, the storage volume ID 1705, and the external storage volume ID 1707 in which values are set.

(vi) Processing Result Specific Example

FIG. 17 shows information stored in the configuration summary table 1700 as a result of performing processing shown in FIG. 21 when the aggregation priority table 1200 stores the information shown in FIG. 12 and the configuration summary information shown in FIG. 14 is acquired.

FIG. 18 and FIG. 19 show contents of the configuration summary table 1700 stored when the configuration summary information shown in FIG. 15 is acquired and when the configuration summary information shown in FIG. 16 is acquired, respectively.

FIG. 20 shows information stored in the configuration summary table 1700 when a row 1213 is deleted from the aggregation priority table 1200, the configuration summary information shown in FIG. 16 is acquired, and the processing shown in FIG. 21 is performed. In this case, concerning a configuration indicated by rows 1611a, 1612a, 1611b, and 1612b in which the relation types 1404a and 1404b of the configuration summary information are "MAP", the related storage apparatus ID 1402a and the related storage volume ID 1403a are discarded. As in rows 2026, 2027, 2028, and 2029, sets of host IDs and the host device IDs 1401a acquired together with configuration summary information of the rows are stored in independent rows of the configuration summary table 1700.

Distribution Processing: Details of Step 1303

Figure 22:
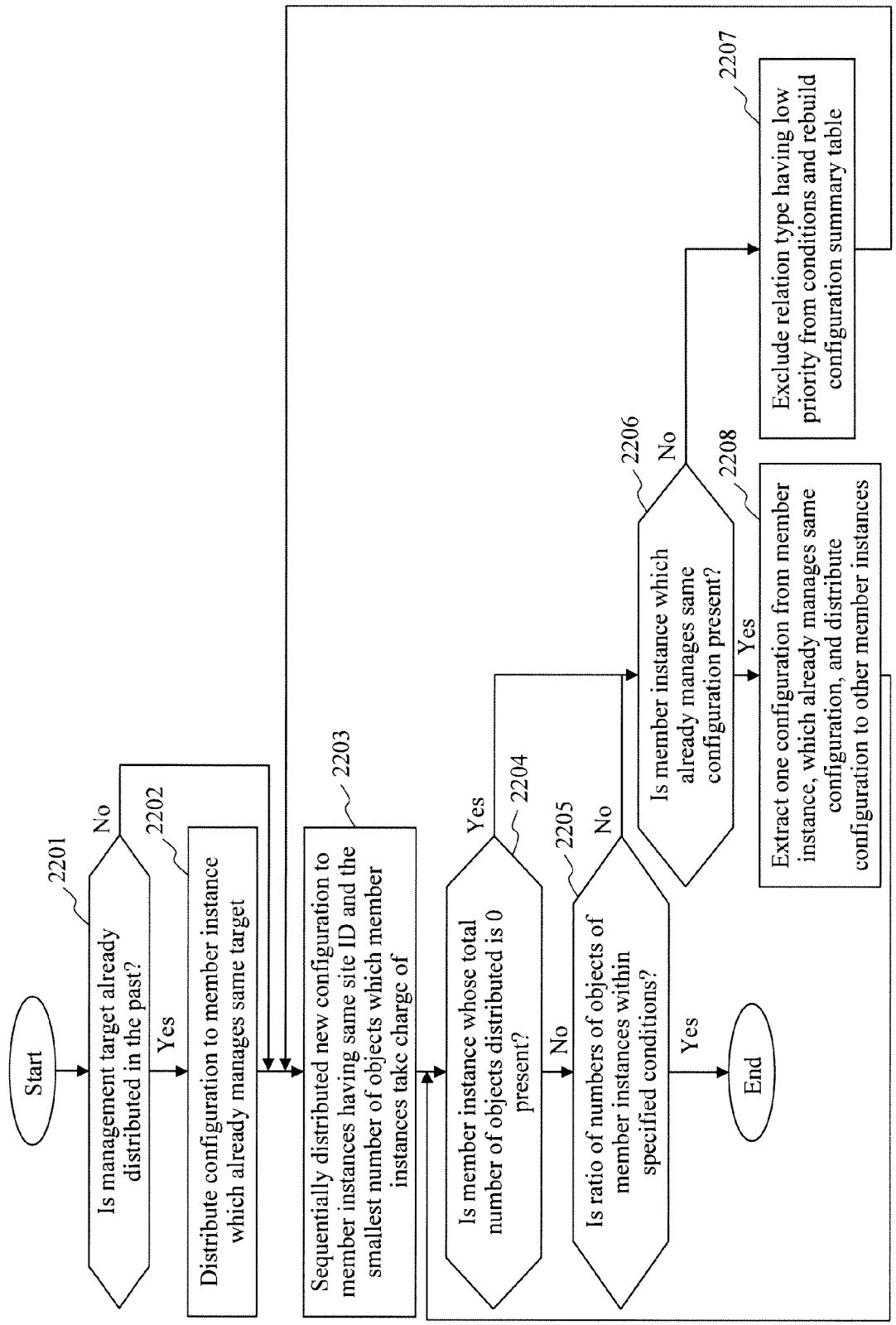
FIG. 22 is a flowchart for explaining details of a processing operation in which the management software on the management server in the present invention distributes management targets to member instances on the basis of the configuration summary table.

FIG. 22 is an example of a flowchart for explaining details of processing in which the management target determination program 162 of the representative instance distributes (allots) management target objects to member instances on the basis of the configuration summary table 1700 in step 1303. Member instances ID 1001 of the member instances to which the management target objects are distributed as a result of the processing are stored in an in-charge instance table 2300 shown in FIGS. 23 and 24. The in-charge instance table 2300 has a configuration obtained by adding an in-charge member instance ID 2301 to the configuration summary table 1700. Values are copied from the configuration summary table 1700. The member instances ID 1001, to which configurations are distributed, are stored in this column. Details of the flowchart of FIG. 22 are explained below.

(i) Step 2201

The management target determination program 162 determines whether distribution of management targets is already performed in the past. This can be determined according to whether values are stored in the in-charge instance table 2300 (see FIG. 23). When at least one management target object is distributed in the past (Yes in step 2201), the processing shifts to step 2202. When no management target object is distributed in the past and all management target objects are new ones (No in step 2201), the processing shifts to step 2203.

(ii) Step 2202

The management target determination program 162 compares the latest configuration summary table 1700 and the in-charge instance table 2200. When there is a row including the same value (hereinafter also simply referred to as "configuration"), a configuration corresponding to a member instance indicated by the in-charge member instance ID 2201 of the in-charge instance table 2200 is distributed.

(iii) Step 2203

The management target determination program 162 allocates rows not distributed yet in the configuration summary table 1700 to the member instances. At this point, to equalize loads on the member instances, the management target determination program 162 distributes the rows such that total numbers of the numbers of objects 1708 which the member instances take charge of are the same. When a value is set in the site ID 1701 of the configuration summary table 1700, management targets are distributed to member instances having the same site ID 1003a of the member instance table 1000a.

(iv) Step 2204

The management target determination program 162 determines whether there is a member instance whose total number of the numbers of objects 1708 is 0 as a result of the processing in step 2203. When there is such a member instance, the processing shifts to step 2206. When there is no such member instance, the processing shifts to step 2205.

(v) Step 2205

The management target determination program 162 determines whether a ratio of the numbers of objects distributed to the member instances is within a specified condition. As the specified condition, for example, "a ratio of the numbers of objects is within a double" is used. When the ratio is within the specified condition, the processing ends. When the ratio is not within the specified condition, the processing shifts to step 2206.

(vi) Step 2206

The management target determination program 162 determines whether a member which manages the same configuration as that at a point when distribution is performed in the past is present. This can be determined according to whether there is a configuration distributed to the member instance in step 2202. When such a member instance is present, the processing shifts to step 2208. When no such member instance is present, the processing shifts to step 2207.

(vii) Step 2207

The management target determination program 162 excludes a relation type having the lowest priority from the aggregation priority table 1200 and performs processing for storing configuration summary information in the configuration summary table 1700 according to the flowchart shown in FIG. 21. The processing shifts to step 2203.

(viii) Step 2208

The management target determination program 162 allocates all management target objects in order to member instances having the same site ID and a small number of in-charge objects as new configurations irrespective of management in-charge instances in the past. In other words, even if management targets are distributed in the past (even if member instances which already manage the same configuration are present), redistribution is executed regarding all the management targets as new configurations.

Configuration Example of the In-Charge Instance Table

FIG. 23 is a diagram showing values stored in the in-charge instance table 2300 as a result of performing the processing according to the flowchart of FIG. 22 when the values shown in FIG. 10(a) are set in the member instance table 1000a and the values shown in FIG. 17 are set in the configuration summary table 1700. In this case, since no value is set in the site ID 1003a of the member instance table 1000a and the site ID 1701 of the configuration summary table 1700, a site ID is not taken into account.

On the other hand, FIG. 24 is a diagram showing values stored in the in-charge instance table 2300 as a result of performing the processing according to the flowchart of FIG. 22 when the values shown in FIG. 10(b) are set in the member instance table 1000a and the values shown in FIG. 19 are set in the configuration summary table 1700. In this case, a configuration is distributed to a member instance, in the site ID 1003a of which the same value as a site ID set in the site ID 1701 of the configuration summary table 1700 is set.

Management Target Notification Processing: Details of Step 1304

Figure 25:
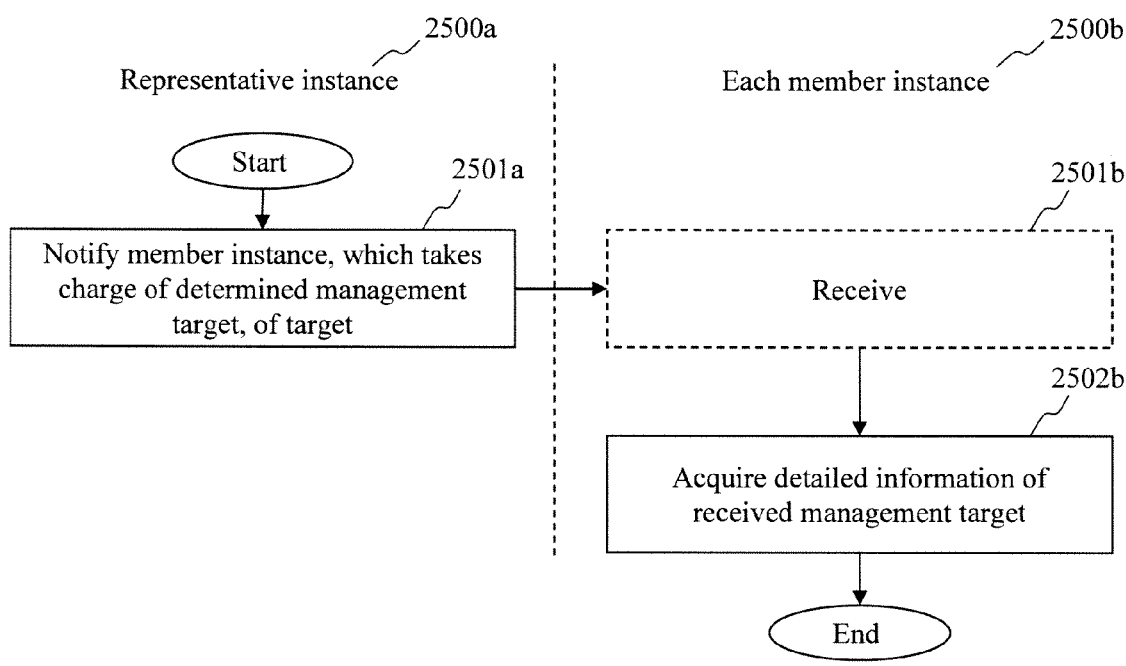
FIG. 25 is a flowchart for explaining details of a processing operation in which the management software on the management server in the present invention notifies management targets.

FIG. 25 is an example of a flowchart for explaining details of processing in which the management target determination program 162 of the representative instance notifies, on the basis of the in-charge instance table 2300, the member instances of management target objects which the member instances should take charge of. The management target objects represent devices on the host computer 100 corresponding to the host device ID 1702 of the in-charge instance table 2200, volumes on the storage apparatus 120 corresponding to the storage apparatus ID 1704 and the storage volume ID 1705, and volumes on the external storage apparatus 140 corresponding to the external storage apparatus ID 1706 and the external storage volume ID 1707.

(i) Step 2501a

The management target determination program 162 of the representative instance notifies each member instance of management objects distributed thereto. Notified contents are the same information as the rows of the in-charge instance table 2300.

(ii) Step 2501b

The management target reception program 163 of the member instance receives the notification of the management objects.

(iii) Step 2502b

The management target reception program 163 of the member instance acquires detailed information of the notified management objects from the host computer 100, the storage apparatus 120, and the external storage apparatus 140 corresponding thereto.

The management target reception program 163 of each member instance may periodically reacquire (refresh) the detailed information of the notified management objects from the host computer 100, the storage apparatus 120, and the external storage apparatus 140 corresponding thereto. In the reacquisition of the detailed information, when there is a change in objects related to the management objects (e.g., volumes on the storage apparatus corresponding to a device on the host computer or volumes corresponding to the volumes on the storage apparatus), the configuration change detection program 164 detects the change, notifies the representative instance of the change, and urges the representative instance to reconsider the management target allocation.

Processing During a Configuration Change

Figure 26:
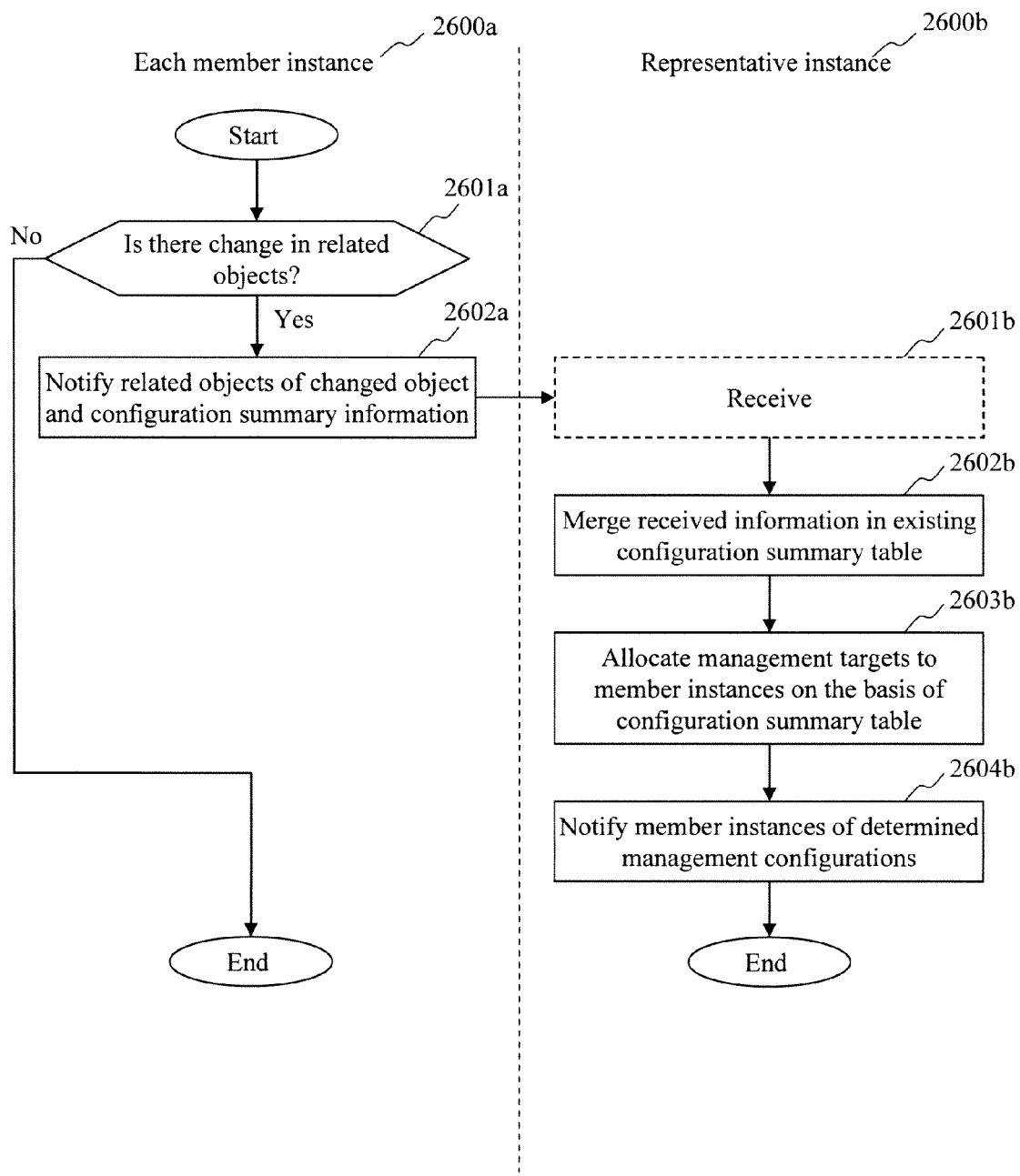
FIG. 26 is a flowchart for explaining details of a processing operation in which the management software on the management server in the present invention detects a change in a configuration and notifies a representative instance of the change.

FIG. 26 is a flowchart of processing performed by the configuration change detection program 164 when the management target reception program 163 reacquires detailed information of management targets.

(i) Step 2601a

The configuration change detection program 164 of the member instance determines whether there is a change in related objects of the management objects (e.g., addition of a new object or a change concerning a correspondence relation). When there is a change, the processing shifts to step 2602a. When there is no change, the processing ends.

(ii) Step 2602a

The configuration change detection program 164 of the member instance notifies the representative instance of configuration summary information of a changed management object.

(iii) Step 2601b

The management target determination program 162 of the representative instance receives the configuration summary information of the changed management object.

(iv) Step 2602b

The management target determination program 162 of the representative instance rewrites information of the existing configuration summary table 1700 on the basis of the received configuration summary information.

(v) Step 2603b

The management target determination program 162 of the representative instance executes the distribution of the management objects again according to the flowchart of FIG. 22 on the basis of the rewritten configuration summary information.

(vi) Step 2604b

The management target determination program 162 of the representative instance notifies the member instances of the distributed management objects according to the flowchart of FIG. 25.

(2) Second Embodiment

In the first embodiment, the form in which the plural management servers (management computers) are basically configured in the storage system (the computer system) 10 and the management servers respectively function as the instances having the storage management software is explained. In a form of a second embodiment, at least one of the plural management servers has plural virtual servers and the respective virtual servers provide instances.

Configuration of a Storage System

Figure 27:
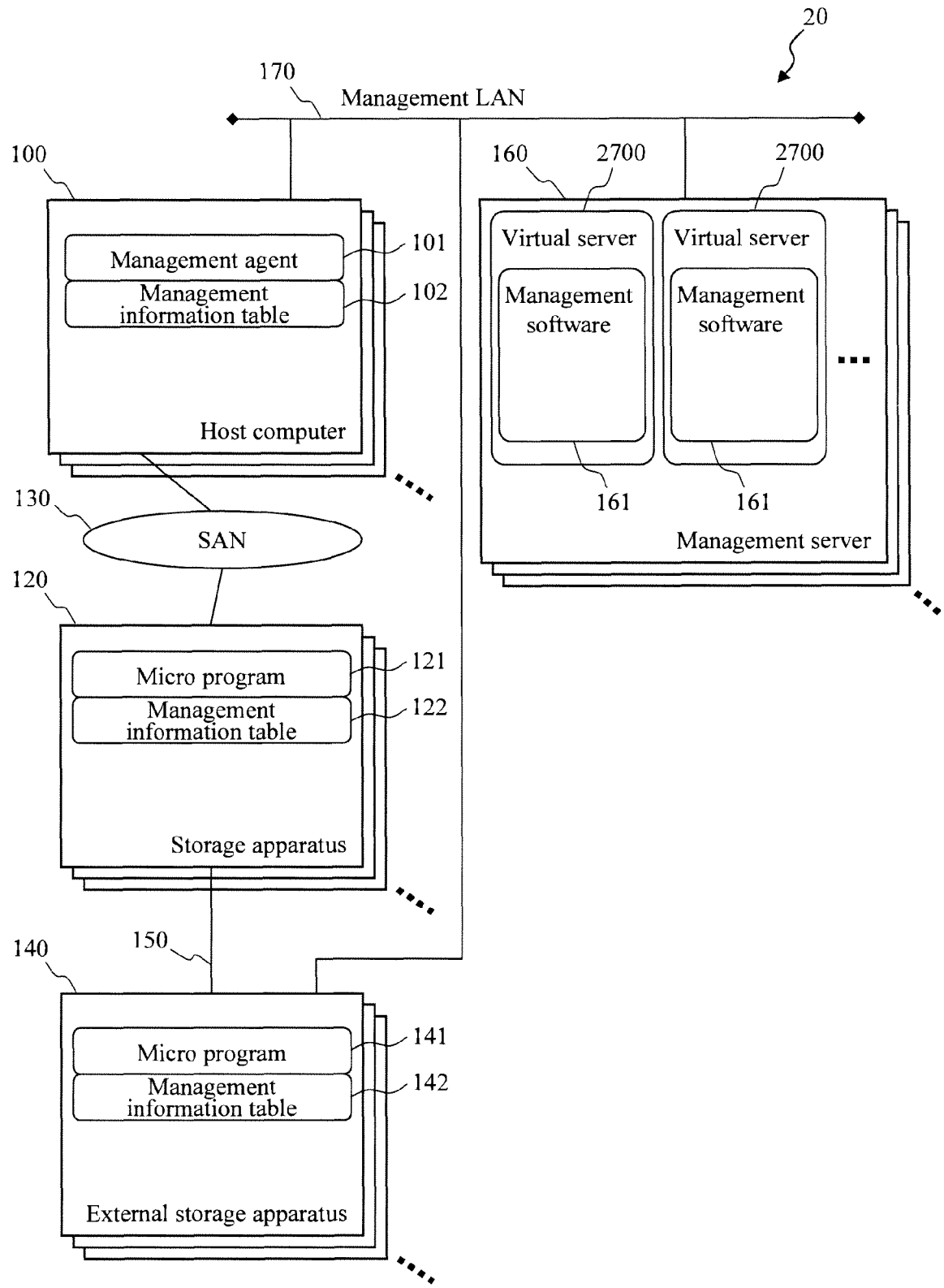
FIG. 27 is a diagram showing a schematic configuration example of a computer system (a storage system) according to a second embodiment of the present invention.

FIG. 27 is a schematic configuration of a storage system according to the second embodiment of the present invention. Internal configurations of the host computers 100, the storage apparatuses 120, and the external storage apparatuses 140 are the same as the configurations explained in the first embodiment. Concerning the management servers 160, at least one of the management servers 160 has plural virtual servers 2700. The management software 161 serving as instances is running on the respective virtual servers 2700.

In the plural virtual servers 2700 running on the one management server 160, a CPU (not shown: also referred to as processor) included in the management server 160 causes virtualization software (hypervisor) to operate. This virtualization software provides the virtual servers 2700 with virtualized hardware. The virtualized hardware (virtual devices) includes a CPU, a memory, and an I/O interface. In other words, the virtual machine server 2700 has a virtual CPU, a virtual memory, and a virtual I/O interface virtually allocated from physical hardware.

Since the virtual servers 2700 operate recognizing the virtual devices provided by the virtualization software as physical hardware, a standard OS environment operates as it is. In other words, in the standard OS environment, various applications operate on an operating system.

A storage system 20 shown in FIG. 27 is different from the storage system 10 (FIG. 1) according to the first embodiment only in that the management software 161 in the virtual servers 2700 operates as the member instances as explained above. Operations in the system are the same as those in the first embodiment.

(3) Modifications

In the first and second embodiments, the configuration in which the clusters of the host computer 100 and the external storage coupling function, the remote copy function, and the local copy function of the storage apparatus 120 are used is explained as an example. However, management targets can be allocated by the same method according to other functions when there is a relation among volumes. Examples of the functions include a multi-path function in the host computer 100 and a thin provisioning function and a storage cluster function of the storage apparatus.

The multi-path function is a function of allocating the same volume to the same host computer using different paths and, when a failure occurs in one path, switching the path to the other path. The thin provisioning function is a function of managing plural volumes in the storage apparatus as a pool, providing the host computer with virtual volumes, and, at timing when data is written in the virtual volumes from the host computer, sequentially slicing storage areas from the pool and allocating the storage areas to sections in which the data is written. The storage cluster function is a function of synchronizing volume data with the remote copy or the like between two storage apparatuses, allocating volumes having the same data from both the storage apparatuses to the same host computer, and, even when a failure occurs in one storage apparatus, enabling the host computer to directly use the volume data synchronized in the other storage apparatus.

(4) Conclusion

In the first embodiment, first, one of the plural management computers is designated or determined as a representative management computer. The representative management computer collects, from the one or plural host computers and the one or plural storage subsystems, object information including information for specifying plural management target objects and configuration summary information including relation type information indicating a relation among the plural management target objects. The representative management computer determines, on the basis of the configuration summary information, management target objects which each of the plural management computers (instances) should aggregate and take charge of and notifies the plural management computers of the management target objects. Consequently, it is possible to distribute the management computers, which should take charge of the management target objects, taking into account the management target objects in the computer system. Therefore, it is possible to prevent occurrence of management inoperability and configuration information inconsistency and perform management operation and information reference in the same way as those performed when all the management target objects are managed by a single instance.

In the second embodiment, the plural virtual management servers (equivalent to instances) are provided on the one management computer (management server). Management target objects which the virtual management servers should take charge of are distributed to the virtual management servers according to the same processing as that in the first embodiment. Consequently, even in a computer system in which plural virtualized management servers are present, it is possible to expect the same effects as those explained above. The virtual management servers and physical plural management servers may be mixed in the computer system.

Plural kinds of relation type information are present. For example, there are a relation of the local copy (LC), a relation of clusters, a relation of direct correspondence (MAP), a relation of the remote copy (RC), and a relation in which the external storage apparatus is set (EXT). In such a case, priority is determined for the relation type information. According to information concerning the priority, it is determined whether the plural management target objects are preferentially distributed to the same management computer (instance). In this way, the management target objects which the same management computer should take charge of are distributed (allotted) taking into account the priority of the relation among the management target objects. Therefore, it is possible to surely distribute objects, which tend to lead to occurrence of management inoperability and configuration information inconsistency, to the same instance. For example, the LC is set to the highest priority and management target objects in a relation of the LC are always distributed to the same instance. This is because, if target objects are distributed to separate instances in the case of LC, likelihood of occurrence of management inoperability and configuration information inconsistency increases.

A correspondence relation among the plural management target objects is put in order on the configuration summary table. Each row on the table is equivalent to objects which one instance should take charge of. Therefore, the management target objects put in order on the table and arranged in entries of each row are distributed as objects which the same instance takes charge of. Consequently, it is possible to efficiently determine an in-charge instance.

When the processing for distributing objects to instances is executed, a management target object distributed to a management computer (an instance) in the past is allocated to the same instance. Concerning a new management target object not distributed to a management computer in the past, a management computer (an instance) is distributed on the basis of the relation type information. Consequently, it is possible to realize an increase in speed and improvement efficiency of the processing. When there is a predetermined deviation in the number of management target objects distributed to the plural management computers as a result of the distribution processing, management computers which take charge of the plural management target objects are determined again. Consequently, it is possible to equalize loads on the instances. For example, after the relation type information which should be taken into account is reduced (information having low priority is excluded from information taken into account), management computers which take charge of the management target objects are determined again. In this way, a relation of objects having low importance is excluded from targets of the distribution processing while a relation among important objects is covered. Consequently, it is possible to balance a reduction in loads on the instances and prevention of occurrence of management inoperability and configuration information inconsistency.

Further, when there is site information indicating arrangement locations of the host computers and the storage subsystems, the site information is collected from the host computers and the storage subsystems. Management target objects which each of the plural management computers (instances) should aggregate and take charge of are determined on the basis of the site information and the configuration summary information. Consequently, it is possible to distribute the in-charge instances taking into account physical setting locations of the host computers and the storage subsystems. Therefore, it is less likely that extreme remote access occurs and it is possible to realize improvement of efficiency of processing and reduce loads on the instances.

The present invention can also be realized by a program code of software for realizing the functions of the embodiments. In this case, a storage medium having recorded therein the program code is provided to a system or an apparatus and a computer (or a CPU or an MPU) of the system or the apparatus reads out the program code stored in the storage medium. In this case, the program code itself read out from the storage medium realizes the functions of the embodiments explained above. The program code itself and the storage medium having the program code stored therein configure the present invention. As the storage medium for supplying such a program code, for example, a flexible disk, a CD-ROM, a DVD-ROM, a hard disk, an optical disk, a magneto-optical disk, a CD-R, a magnetic tape, a nonvolatile memory card, or a ROM is used.

It is also possible that an OS (operating system) or the like running on a computer performs a part or all of actual processing on the basis of an instruction of the program code and the functions of the embodiments are realized by the processing. Further, it is also possible that, after the program code read out from the storage medium is written in a memory on the computer, a CPU or the like of the computer performs a part or all of actual processing on the basis of an instruction of the program code and the functions of the embodiments are realized by the processing.

Moreover, it is also possible that the program code of the software for realizing the functions of the embodiments is delivered via a network, whereby the program code is stored in storing means such as a hard disk or a memory of a system or an apparatus or a storage medium such as a CD-RW or a CD-R and, when the program code is used, a computer (or a CPU or an MPU) of the system or the apparatus reads out and executes the program code stored in the storing means or the storage medium.

Lastly, it is necessary to understand that the process and the technique explained above are not essentially related to any specific apparatus and can be implemented by any appropriate combination of components. Further, it is possible to use general-purpose devices of various types according to the teaching explained above. It may be seen that it is useful to build a dedicated apparatus to execute the steps of the method explained above. Various inventions can be formed by an appropriate combination of the plural components disclosed in the embodiments. For example, several components may be deleted from all the components explained in the embodiments. Further, the components explained in the different embodiments may be combined as appropriate. The present invention is described in relation to the specific examples. However, the specific examples are for explanation and are not for limitation in every aspect. It would be understood by those skilled in the art that there are a large number of combinations of hardware, software, and firmware suitable for carrying out the present invention. For example, the software explained above can be implemented in a program or a script language in a wide range such as assembler, C/C++, perl, Shell, PHP, and Java (registered trademark).

Further, in the embodiments, control lines and information lines considered necessary in explanation are shown. Not all control lines and information lines are shown in terms of a product. All components may be coupled to one another.

In addition, other implementations of the present invention would be made apparent for those having ordinary knowledge in the technical field from the examination of the specification and the embodiments of the present invention disclosed herein. The various forms and/or components of the explained embodiments can be used independently or in any combination in a computerized storage system having a function of managing data. The specification and the specific examples are merely typical ones. The scope and the spirit of the present invention are indicated by the following claims.

REFERENCE SIGNS LIST 10 computer system (storage system)
100 host computers
101 management agent
102 management information table
120 storage apparatuses (storage subsystems)
121 micro program
122 management information table
130 SAN
140 external storage apparatuses (externally-coupled storage apparatuses)
141 micro program
142 management information table
150 SAN
160 management servers (management computers)
161 management software
162 management target determination program
163 management target reception program
164 configuration change detection program
165 management information table
166 instance cooperation program
170 management LAN

The invention claimed is:

1. A computer system comprising:
at least one host computer;
at least one storage subsystem coupled to the at least one host computer and which is configured to provide the at least one host computer with information; and
a plurality of management computers which are coupled to the at least one storage subsystem and the at least one host computer and which are configured to manage a plurality of management target objects included in the at least one storage subsystem and the at least one host computer, wherein one of the plurality of management computers is configured to
serve as a representative management computer among the plurality of management computers,
collect, from the at least one host computer and the at least one storage subsystem, object information including information for specifying the plurality of management target objects and configuration summary information which includes relation type information indicating a relation among the plurality of management target objects and mapping information for the plurality of management target objects,
determine, on the basis of the configuration summary information, management target objects which each of the plurality of management computers should aggregate and take charge of, and
notify the plurality of management computers of the management target objects,
wherein the representative management computer is configured to put in order a correspondence relation among the plurality of management target objects on the basis of the relation type information and to allocate the management target objects having the correspondence relation as management target objects to be taken charge of by a same management computer.

2. A computer system according to claim 1, wherein a plurality of kinds of the relation type information are present,
at least the representative management computer is configured to store information concerning priority of the relation type information used as an indicator for determining whether the plurality of management target objects are preferentially allocated to a same management computer, and
the representative management computer is configured to determine in-charge allocation to the plurality of management computers of the plurality of management target objects by taking into account priority of the relation type information.

3. A computer system according to claim 1, wherein the representative management computer is configured to allocate a management target object allocated to a management computer in the past to the same management computer as the management computer to which the management target object was previously allocated.

4. A computer system according to claim 3, wherein the representative management computer is configured to allocate a new management target object not allocated in the past to the management computer on the basis of the relation type information and, when there is a predetermined deviation in a number of the management target objects allocated to the plurality of management computers as a result of allocation processing, determine again the management computers which take charge of the plurality of management target objects.

5. A computer system according to claim 4, wherein the representative management computer is configured to determine again, after reducing the relation type information which should be taken into account, the management computers which take charge of the plurality of management target objects.

6. A computer system according to claim 2, wherein
the relation type information includes information about the management target objects being in a local copy relation, in a cluster formation relation, in a direct correspondence relation, and being present in an external storage,
the management target objects being in the local copy relation are set to have a highest priority, and
the representative management computer is configured to always allocate the management target objects in the local copy relation to the same management computer.

7. A computer system according to claim 1, wherein the representative management computer is configured to
collect, from the at least one host computer and the at least one storage subsystem, site information indicating arrangement locations of the at least one host computer and the at least one storage subsystem, and determine, on the basis of the site information and the configuration summary information, management target objects for which each of the plurality of management computers should aggregate and take charge.

8. A management method for a computer system including:
at least one host computer;
at least one storage subsystem coupled to the at least one at least one host computer and configured to provide the at least one host computer with information; and
a management computer which is coupled to the at least one storage subsystem and the at least one host computer and configured to manage a plurality of management target objects included in the at least one storage subsystem and the at least one host computer, the management computer including a processor and a memory and configured to provide a plurality of virtual management servers which manage the plural management target objects,
the management method comprising:
collecting, by the processor, from the at least one host computer and the at least one at least one storage subsystem, object information including information for specifying the plurality of management target objects and configuration summary information which includes relation type information indicating a relation among the plurality of management target objects and mapping information for the plurality of management target objects;
determining, by the processor, on the basis of the configuration summary information included in the summary information, management target objects which each of the plurality of virtual management servers should aggregate and take charge of; and
notifying, by the processor, each of the plurality of virtual management servers of the determined management target objects of which the plurality of virtual management servers should take charge,
putting in order, by the processor, a correspondence relation among the plurality of management target objects on the basis of the relation type information, and allocating the management target objects having the correspondence relation as management target objects to be taken charge of by a same virtual management server.

9. A management method according to claim 8, wherein a plurality of kinds of the relation type information are present,
wherein the method further comprises providing, by the processor, the plurality of virtual management servers with information concerning a priority of the relation type information used as an indicator for determining whether the plurality of management target objects are preferentially allocated to a same virtual management server, and
wherein the determining comprises determining an in-charge allocation to the plurality of virtual management servers of the plurality of management target objects by taking into account the priority of the relation type information.

10. A management method according to claim 8, wherein, in the determining, the processor allocates a management target object allocated to a virtual management server in the past to the same virtual management server as the virtual management server.

11. A management method according to claim 10, wherein, in the determining, the processor allocates, to a new management target object not allocated to a virtual management server in the past, the virtual management server on the basis of the relation type information, and
the management method further comprises determining again, by the processor, when there is a predetermined deviation in a number of the management target objects allocated to the plurality of virtual management servers as a result of allocation processing, the virtual management servers which take charge of the plurality of management target objects.

12. A management method according to claim 11, wherein, in the determining again, the processor determines again, after reducing the relation type information which should be taken into account, the virtual management servers which take charge of the plurality of management target objects.

13. A non-transitory computer-readable storage medium for a computer system including at least one host computer coupled to at least one storage subsystem that provides information to the at least one host computer, and a plurality of management computers coupled to the at least one storage subsystem and the at least one host computer, which plurality of management computers is configured to manage a plurality of management target objects in the at least one host computer and the at least one storage system, the computer-readable storage medium having instructions stored thereon that, when executed, cause one of the plurality of management computers to perform operations comprising:
processing for collecting, from the at least one host computer and the at least one storage subsystem, object information including information for specifying the plurality of management target objects and configuration summary information which includes relation type information indicating a relation among the plurality of management target objects and mapping information for the plurality of management target objects;
processing for determining, on the basis of the relation type information included in the configuration summary information, management target objects which each of the plurality of management computers should aggregate and take charge of; and
processing for notifying the plurality of management computers of the management target objects,
putting in order a correspondence relation among the plurality of management target objects on the basis of the relation type information and allocating the management target objects having the correspondence relation as management target objects to be taken charge of by a same management computer.

* * * * *